(12) United States Patent
Tucholski et al.

(10) Patent No.: US 8,441,411 B2
(45) Date of Patent: May 14, 2013

(54) INTEGRATED ELECTRONIC DEVICE AND METHODS OF MAKING THE SAME

(75) Inventors: Gary R. Tucholski, North Royalton, OH (US); Leonard Blaine Allison, North Royalton, OH (US)

(73) Assignee: Blue Spark Technologies, Inc., Westlake, OH (US)

( * ) Notice: Subject to any disclaimer, the term of this patent is extended or adjusted under 35 U.S.C. 154(b) by 504 days.

(21) Appl. No.: 12/669,067

(22) PCT Filed: Jul. 18, 2008

(86) PCT No.: PCT/US2008/070500
§ 371 (c)(1),
(2), (4) Date: Jan. 14, 2010

(87) PCT Pub. No.: WO2009/012463
PCT Pub. Date: Jan. 22, 2009

(65) Prior Publication Data
US 2010/0196744 A1    Aug. 5, 2010

Related U.S. Application Data

(60) Provisional application No. 60/950,401, filed on Jul. 18, 2007.

(51) Int. Cl.
*H01Q 15/02* (2006.01)
(52) U.S. Cl.
USPC .......................................................... 343/909
(58) Field of Classification Search ......... 29/601; 429/7, 429/127, 185; 343/909
See application file for complete search history.

(56) References Cited

U.S. PATENT DOCUMENTS

| | | | |
|---|---|---|---|
| 629,325 | A | 7/1899 | Ashley |
| 629,372 | A | 7/1899 | Kennedy |
| 2,154,312 | A | 4/1939 | MacCallum |
| 2,480,531 | A | 8/1949 | Wilke |
| 2,637,757 | A | 5/1953 | Wilke |
| 2,688,649 | A | 9/1954 | Bjorksten |
| 2,903,498 | A | 9/1959 | Sindel et al. |
| 2,905,738 | A | 9/1959 | Di Pasquale et al. |
| 3,006,980 | A | 10/1961 | Story |

(Continued)

FOREIGN PATENT DOCUMENTS

| | | |
|---|---|---|
| DE | 19943961 A1 | 6/2000 |
| EP | 0678927 A1 | 10/1995 |

(Continued)

OTHER PUBLICATIONS

Acheson Colloids Company, "Sales Information Bulletin," Port Huron, MI.

(Continued)

*Primary Examiner* — Huedung Mancuso
(74) *Attorney, Agent, or Firm* — Pearne & Gordon LLP

(57) ABSTRACT

An integrated electronic device, and its method of manufacture, are provided. The integrated electronic device can include an electronic assembly, such as an active RFID assembly, that is electrically coupled to a thin printed flexible electrochemical cell. In one example, the electronic assembly and the electrochemical battery are provided on a single substrate. In one example method of manufacture, the entire cell to be made on a printing press to integrate the battery directly with the electronic assembly.

29 Claims, 10 Drawing Sheets

U.S. PATENT DOCUMENTS

| | | |
|---|---|---|
| 3,230,115 A | 1/1966 | Tamminen |
| 3,375,136 A | 3/1968 | Biggar |
| 3,655,449 A | 4/1972 | Yamamoto et al. |
| 3,770,504 A | 11/1973 | Bergum |
| 3,799,808 A | 3/1974 | Hancock |
| 3,847,669 A | 11/1974 | Paterniti |
| 3,901,732 A | 8/1975 | Kalnoki Kis et al. |
| 3,928,077 A | 12/1975 | Sperandio et al. |
| 3,954,506 A | 5/1976 | Sullivan |
| 3,967,292 A | 6/1976 | Delahunt |
| 3,980,497 A | 9/1976 | Gillman et al. |
| 3,988,168 A | 10/1976 | Bruneau |
| 3,993,508 A | 11/1976 | Erlichman |
| 4,001,467 A | 1/1977 | Sullivan |
| 4,006,036 A | 2/1977 | Charkoudian |
| 4,007,472 A | 2/1977 | Land |
| 4,028,479 A | 6/1977 | Fanciullo et al. |
| 4,042,760 A | 8/1977 | Land |
| 4,047,289 A | 9/1977 | Wolff |
| 4,060,669 A | 11/1977 | Fanciullo |
| 4,070,528 A | 1/1978 | Bergum et al. |
| 4,080,728 A | 3/1978 | Buckler |
| 4,086,399 A | 4/1978 | Hyland et al. |
| 4,086,400 A | 4/1978 | Hyland et al. |
| 4,098,965 A | 7/1978 | Kinsman |
| 4,105,815 A | 8/1978 | Buckler |
| 4,105,831 A | 8/1978 | Plasse |
| 4,112,205 A | 9/1978 | Charkoudian et al. |
| 4,118,860 A | 10/1978 | Buckler et al. |
| 4,119,770 A | 10/1978 | Land |
| 4,124,742 A | 11/1978 | Land et al. |
| 4,125,684 A | 11/1978 | Land |
| 4,125,685 A | 11/1978 | Bloom et al. |
| 4,125,686 A | 11/1978 | Kinsman |
| 4,136,236 A | 1/1979 | Ruetschi |
| 4,137,627 A | 2/1979 | Kinsman |
| 4,145,485 A | 3/1979 | Kinsman |
| 4,150,200 A | 4/1979 | Sullivan |
| 4,152,825 A | 5/1979 | Bruneau |
| 4,172,184 A | 10/1979 | Bloom et al. |
| 4,172,319 A | 10/1979 | Bloom et al. |
| 4,175,052 A | 11/1979 | Norteman, Jr. |
| 4,177,330 A | 12/1979 | Gordon et al. |
| 4,177,552 A | 12/1979 | Gordon et al. |
| 4,181,778 A | 1/1980 | Land |
| 4,185,144 A | 1/1980 | Ames et al. |
| 4,194,061 A | 3/1980 | Land et al. |
| 4,195,121 A | 3/1980 | Peterson |
| 4,204,036 A | 5/1980 | Cohen et al. |
| 4,232,099 A | 11/1980 | Sullivan |
| 4,242,424 A | 12/1980 | Buckler et al. |
| 4,254,191 A | 3/1981 | Kniazzeh |
| 4,256,813 A | 3/1981 | Kniazzeh |
| 4,287,274 A | 9/1981 | Ibbotson et al. |
| 4,345,954 A | 8/1982 | Panchu |
| 4,361,633 A | 11/1982 | Nel et al. |
| 4,389,470 A | 6/1983 | Plasse |
| 4,400,452 A | 8/1983 | Bruder |
| 4,427,748 A | 1/1984 | Land |
| 4,429,026 A | 1/1984 | Bruder |
| 4,455,358 A | 6/1984 | Graham et al. |
| 4,466,470 A | 8/1984 | Bruder |
| 4,477,544 A | 10/1984 | Bruder |
| 4,502,903 A | 3/1985 | Bruder |
| 4,505,996 A | 3/1985 | Simonton |
| 4,525,439 A | 6/1985 | Simonton |
| 4,532,193 A | 7/1985 | Kniazzeh et al. |
| 4,539,275 A | 9/1985 | Plasse |
| 4,554,226 A | 11/1985 | Simonton |
| 4,604,334 A | 8/1986 | Tarascon |
| 4,608,279 A | 8/1986 | Schumm, Jr. |
| 4,609,597 A | 9/1986 | Plasse |
| 4,621,035 A | 11/1986 | Bruder |
| 4,623,598 A | 11/1986 | Waki et al. |
| 4,664,993 A | 5/1987 | Sturgis et al. |
| 4,756,717 A | 7/1988 | Sturgis et al. |
| 4,889,777 A | 12/1989 | Akuto |
| 4,916,035 A | 4/1990 | Yamashita et al. |
| 4,977,046 A | 12/1990 | Bleszinski, Jr. et al. |
| 4,997,732 A | 3/1991 | Austin et al. |
| 5,035,965 A | 7/1991 | Sangyoji et al. |
| 5,055,968 A | 10/1991 | Nishi et al. |
| 5,110,696 A | 5/1992 | Shokoohi et al. |
| 5,116,701 A | 5/1992 | Kalisz |
| 5,120,785 A | 6/1992 | Walker et al. |
| 5,217,828 A | 6/1993 | Sangyoji et al. |
| 5,259,891 A | 11/1993 | Matsuyama et al. |
| 5,326,652 A | 7/1994 | Lake |
| 5,330,860 A | 7/1994 | Grot et al. |
| 5,338,625 A | 8/1994 | Bates et al. |
| 5,350,645 A | 9/1994 | Lake et al. |
| 5,401,590 A | 3/1995 | Chalilpoyil et al. |
| 5,415,888 A | 5/1995 | Banerjee et al. |
| 5,424,151 A | 6/1995 | Koksbang et al. |
| 5,445,856 A | 8/1995 | Chaloner-Gill |
| 5,455,127 A | 10/1995 | Olsen et al. |
| 5,470,357 A | 11/1995 | Schmutz et al. |
| 5,514,492 A | 5/1996 | Marincic et al. |
| 5,547,911 A | 8/1996 | Grot |
| 5,565,143 A | 10/1996 | Chan |
| 5,578,390 A | 11/1996 | Hughen |
| 5,587,254 A | 12/1996 | Kojima et al. |
| 5,620,580 A | 4/1997 | Okabe et al. |
| 5,622,652 A | 4/1997 | Kucherovsky et al. |
| 5,624,468 A | 4/1997 | Lake |
| 5,637,418 A | 6/1997 | Brown et al. |
| 5,652,043 A | 7/1997 | Nitzan |
| 5,658,684 A | 8/1997 | Lake |
| 5,728,181 A | 3/1998 | Jung et al. |
| 5,735,912 A | 4/1998 | Lake |
| 5,735,914 A | 4/1998 | Lake |
| 5,747,190 A | 5/1998 | Lake |
| 5,747,191 A | 5/1998 | Lake |
| 5,759,215 A | 6/1998 | Masuda |
| 5,779,839 A | 7/1998 | Tuttle et al. |
| 5,811,204 A | 9/1998 | Nitzan |
| 5,865,859 A | 2/1999 | Lake |
| 5,897,522 A | 4/1999 | Nitzan |
| 5,906,661 A | 5/1999 | Lake |
| 5,930,023 A | 7/1999 | Mitchell, Jr. et al. |
| 5,941,844 A | 8/1999 | Eckenhoff |
| 6,025,089 A | 2/2000 | Lake |
| 6,030,423 A | 2/2000 | Lake |
| 6,030,721 A | 2/2000 | Lake |
| 6,045,942 A | 4/2000 | Miekka et al. |
| 6,078,842 A | 6/2000 | Gross et al. |
| 6,084,380 A | 7/2000 | Burton |
| RE36,843 E | 8/2000 | Lake et al. |
| 6,136,468 A | 10/2000 | Mitchell, Jr. et al. |
| 6,157,858 A | 12/2000 | Gross et al. |
| 6,186,982 B1 | 2/2001 | Gross et al. |
| 6,187,475 B1 | 2/2001 | Oh et al. |
| 6,200,704 B1 | 3/2001 | Katz et al. |
| 6,208,524 B1 | 3/2001 | Tuttle |
| 6,235,422 B1 | 5/2001 | Kaplan et al. |
| 6,243,192 B1 | 6/2001 | Mitchell, Jr. et al. |
| 6,273,904 B1 | 8/2001 | Chen et al. |
| 6,277,520 B1 | 8/2001 | Moutsios et al. |
| 6,278,904 B1 | 8/2001 | Ishii |
| 6,317,630 B1 | 11/2001 | Gross et al. |
| 6,369,793 B1 | 4/2002 | Parker |
| 6,379,835 B1 | 4/2002 | Kucherovsky et al. |
| 6,395,043 B1 | 5/2002 | Shadle et al. |
| 6,421,561 B1 | 7/2002 | Morris |
| 6,458,234 B1 | 10/2002 | Lake et al. |
| 6,503,658 B1 | 1/2003 | Klein et al. |
| 6,569,572 B1 | 5/2003 | Ochiai et al. |
| 6,576,364 B1 | 6/2003 | Mitchell, Jr. et al. |
| 6,643,532 B2 | 11/2003 | Axelgaard |
| 6,653,014 B2 | 11/2003 | Anderson et al. |
| 6,664,006 B1 | 12/2003 | Munshi |
| 6,676,021 B1 | 1/2004 | Luski et al. |
| 6,676,714 B2 | 1/2004 | Langan |
| 6,697,694 B2 | 2/2004 | Mogensen |
| 6,708,050 B2 | 3/2004 | Carim |
| 6,709,778 B2 | 3/2004 | Johnson |
| 6,729,025 B2 | 5/2004 | Farrell et al. |

| | | |
|---|---|---|
| 6,740,451 B2 | 5/2004 | Christian et al. |
| 6,743,546 B1 | 6/2004 | Kaneda et al. |
| 6,752,842 B2 | 6/2004 | Luski et al. |
| 6,757,560 B1 | 6/2004 | Fischer et al. |
| 6,816,125 B2 | 11/2004 | Kuhns et al. |
| 6,836,215 B1 | 12/2004 | Laurash et al. |
| 6,838,209 B2 | 1/2005 | Langan et al. |
| 6,855,441 B1 | 2/2005 | Levanon |
| 6,884,546 B1 | 4/2005 | Fujita et al. |
| 6,888,502 B2 | 5/2005 | Beigel et al. |
| 6,899,976 B2 | 5/2005 | Larson et al. |
| 6,915,159 B1 | 7/2005 | Kuribayashi et al. |
| 7,017,822 B2 | 3/2006 | Aisenbrey |
| 7,022,431 B2 | 4/2006 | Shchori et al. |
| 7,031,768 B2 | 4/2006 | Anderson et al. |
| 7,043,297 B2 | 5/2006 | Keusch et al. |
| 7,049,962 B2 | 5/2006 | Atherton et al. |
| 7,164,384 B2 | 1/2007 | Howard |
| 7,224,280 B2 | 5/2007 | Ferguson et al. |
| RE39,676 E | 6/2007 | Nitzan |
| 7,233,250 B2 | 6/2007 | Forster |
| 7,238,196 B2 | 7/2007 | Wibaux |
| 7,244,326 B2 | 7/2007 | Craig et al. |
| 7,294,209 B2 * | 11/2007 | Shakespeare ............ 118/729 |
| 7,320,845 B2 | 1/2008 | Zucker |
| 7,335,441 B2 | 2/2008 | Luski et al. |
| 7,340,297 B2 | 3/2008 | Tamarkin et al. |
| 7,340,310 B2 | 3/2008 | Nitzan et al. |
| 7,348,096 B2 | 3/2008 | Schubert et al. |
| 7,364,896 B2 | 4/2008 | Schembri |
| 7,368,191 B2 | 5/2008 | Andelman et al. |
| 7,383,083 B2 | 6/2008 | Fischer et al. |
| 7,394,382 B2 | 7/2008 | Nitzan et al. |
| 7,461,613 B2 | 12/2008 | Sinclair et al. |
| 7,483,738 B2 | 1/2009 | Tamarkin et al. |
| 7,491,465 B2 | 2/2009 | Nitzan et al. |
| 7,501,208 B2 | 3/2009 | Feddrix et al. |
| 7,504,952 B2 | 3/2009 | Kaplan et al. |
| 7,599,192 B2 | 10/2009 | Pennaz et al. |
| 7,603,144 B2 * | 10/2009 | Jenson et al. ............ 455/573 |
| 7,625,664 B2 | 12/2009 | Schubert et al. |
| 7,643,874 B2 | 1/2010 | Nitzan et al. |
| 7,652,188 B2 | 1/2010 | Levanon et al. |
| 7,727,290 B2 | 6/2010 | Zhang et al. |
| 7,884,720 B2 | 2/2011 | Nitzan et al. |
| 2002/0086215 A1 | 7/2002 | Tamura et al. |
| 2002/0095780 A1 | 7/2002 | Shadle et al. |
| 2002/0110733 A1 | 8/2002 | Johnson |
| 2002/0182485 A1 | 12/2002 | Anderson |
| 2002/0192542 A1 | 12/2002 | Luski et al. |
| 2003/0014014 A1 | 1/2003 | Nitzan et al. |
| 2003/0059673 A1 | 3/2003 | Langan et al. |
| 2003/0082437 A1 | 5/2003 | Sotomura |
| 2003/0130015 A1 | 7/2003 | McTaggart |
| 2003/0165744 A1 | 9/2003 | Schubert et al. |
| 2003/0187338 A1 | 10/2003 | Say et al. |
| 2003/0219648 A1 | 11/2003 | Zucker |
| 2003/0232248 A1 | 12/2003 | Iwamoto et al. |
| 2004/0001998 A1 | 1/2004 | Hopkins et al. |
| 2004/0018422 A1 | 1/2004 | Islam et al. |
| 2004/0170896 A1 | 9/2004 | Murata et al. |
| 2004/0209160 A1 | 10/2004 | Luski et al. |
| 2004/0217865 A1 | 11/2004 | Turner |
| 2004/0267189 A1 | 12/2004 | Mavor et al. |
| 2004/0267190 A1 | 12/2004 | Tamarkin et al. |
| 2004/0267283 A1 | 12/2004 | Mavor et al. |
| 2005/0013783 A1 | 1/2005 | Perricone |
| 2005/0038473 A1 | 2/2005 | Tamarkin et al. |
| 2005/0085751 A1 | 4/2005 | Daskal et al. |
| 2005/0147880 A1 | 7/2005 | Takahashi et al. |
| 2005/0194454 A1 | 9/2005 | Ferber et al. |
| 2005/0260492 A1 | 11/2005 | Tucholski et al. |
| 2006/0001528 A1 | 1/2006 | Nitzan et al. |
| 2006/0007049 A1 | 1/2006 | Nitzan et al. |
| 2006/0012464 A1 | 1/2006 | Nitzan et al. |
| 2006/0087432 A1 | 4/2006 | Corbett |
| 2006/0131616 A1 | 6/2006 | Devaney et al. |
| 2006/0146271 A1 | 7/2006 | Pennaz |
| 2006/0159899 A1 | 7/2006 | Edwards et al. |
| 2006/0211936 A1 | 9/2006 | Hu et al. |
| 2006/0216586 A1 | 9/2006 | Tucholski |
| 2006/0253061 A1 | 11/2006 | Anderson et al. |
| 2006/0264804 A1 | 11/2006 | Karmon et al. |
| 2007/0007661 A1 | 1/2007 | Burgess et al. |
| 2007/0011870 A1 | 1/2007 | Lerch et al. |
| 2007/0016277 A1 | 1/2007 | Karat et al. |
| 2007/0024425 A1 | 2/2007 | Nitzan et al. |
| 2007/0060862 A1 | 3/2007 | Sun et al. |
| 2007/0066930 A1 | 3/2007 | Tanioka et al. |
| 2007/0211398 A1 | 9/2007 | Whitney |
| 2007/0243459 A1 | 10/2007 | Jenson et al. |
| 2007/0290051 A1 | 12/2007 | Bielmann et al. |
| 2008/0007409 A1 | 1/2008 | Ferry et al. |
| 2008/0021436 A1 | 1/2008 | Wolpert et al. |
| 2008/0035740 A1 | 2/2008 | Tanner |
| 2008/0091095 A1 | 4/2008 | Heller et al. |
| 2008/0174380 A1 | 7/2008 | Nitzan et al. |
| 2008/0218345 A1 | 9/2008 | Nitzan et al. |
| 2008/0239644 A1 | 10/2008 | Cassidy et al. |
| 2008/0272890 A1 | 11/2008 | Nitzan et al. |
| 2009/0230197 A1 | 9/2009 | Tanner |
| 2010/0072271 A1 | 3/2010 | Thorstensson |
| 2010/0209756 A1 | 8/2010 | Bailey et al. |

FOREIGN PATENT DOCUMENTS

| | | |
|---|---|---|
| EP | 0862227 A1 | 9/1998 |
| EP | 1 026 767 A1 | 8/2000 |
| EP | 1096589 A1 | 5/2001 |
| EP | 1107336 A2 | 6/2001 |
| JP | S55-133770 A | 10/1980 |
| JP | 58-206048 A | 12/1983 |
| JP | 59-228353 A | 12/1984 |
| JP | S61-55866 A | 3/1986 |
| JP | 61-64077 A | 4/1986 |
| JP | 62-126557 A | 6/1987 |
| JP | 62-165875 A | 7/1987 |
| JP | 62-165876 A | 7/1987 |
| JP | 62-285954 A | 12/1987 |
| JP | 63-081762 | 4/1988 |
| JP | 63-119155 A | 5/1988 |
| JP | 64-24364 A | 1/1989 |
| JP | H02-273464 | 11/1990 |
| JP | H04-276665 | 10/1992 |
| JP | 5-217587 A | 8/1993 |
| JP | 5-225989 A | 9/1993 |
| JP | 5-275087 A | 10/1993 |
| JP | 2000-164033 A | 6/2000 |
| JP | 2000-229128 A | 8/2000 |
| JP | 2000-319381 A | 11/2000 |
| JP | 2001-23695 A | 1/2001 |
| JP | 2001-521676 A | 11/2001 |
| JP | 2003-151634 A | 5/2003 |
| JP | 2003-282148 A | 10/2003 |
| JP | 2004-336240 A | 11/2004 |
| JP | 2005-39256 A | 2/2005 |
| TW | 540185 B | 7/2003 |
| WO | 96/38867 A1 | 12/1996 |
| WO | 97/17735 A1 | 5/1997 |
| WO | 98/22987 A2 | 5/1998 |
| WO | 98/48469 A1 | 10/1998 |
| WO | 00/36672 A1 | 6/2000 |
| WO | 03/069700 A2 | 8/2003 |
| WO | 2006/003648 A2 | 1/2006 |

OTHER PUBLICATIONS

Acheson Industries, "Acheson Electrical Materials," from www.achesonindustries.com, dated Nov. 24, 2009.

Advanced Coatings and Chemicals, "Technical Data Sheet," Temple City, CA.

Linden, D., Handbook of Batteries and Fuel Cells, pp. 5.5-5.7, McGraw-Hill, Inc., 1984.

Linden, D., Handbook of Batteries, Second Edition, pp. 8.8-8.9, McGraw-Hill, Inc., 1995.

International Search Report and Written Opinion issued Dec. 31, 2008 in related PCT Application PCT/US2008/070500.

International Search Report and Written Opinion issued Jan. 30, 2009 in PCT Application PCT/US2008/071549.

International Search Report and Written Opinion issued Aug. 6, 2009 in PCT Application PCT/US2008/087424.
Prosecution history for U.S. Appl. No. 11/110,202.
Prosecution history for U.S. Appl. No. 11/378,520.
Prosecution history for U.S. Appl. No. 11/379,816.
Prosecution history for U.S. Appl. No. 12/669,068.

Omnexus Adhesives & Sealant Solutions, "Ethylene Vinyl Acetate (EVA) and Other Hot Melts," from http://www.omnexus4adhesives.com/bc/construction-channel/index.aspx?id=ethylene.
Hartman, Lauren R., "Flexibles stay resilient," Packaging Digest, Mar. 1, 2005.

* cited by examiner

INTEGRATED ELECTRONIC DEVICE AND METHODS OF MAKING THE SAME

CROSS-REFERENCE TO RELATED APPLICATIONS

This application claims the benefit of U.S. provisional application Ser. No. 60/950,401, filed on Jul. 18, 2007, which is incorporated herein in its entirety by reference thereto.

BACKGROUND OF THE INVENTION

For the past one hundred years or so, scientists have been making Carbon/Zinc portable power sources for various applications. In the early days of portable power, these power sources were very large compared to today's standards. For example, the very popular "Ignitor Cell" made by Eveready was about 3" diameter and about 9" tall and was used in many applications such as radios, buzzers, Xmas lighting, etc. These large cells, as well as some smaller versions, such as the famous Eveready #6 (about 2" dia.×6" tall) and the smallest unit cell of the day, the #950 (D size), were commonly made into battery packs with voltages exceeding 40 volts in some applications. These were similar in size, and even larger, than today's car batteries, for uses in lighting devices, radios and car ignition systems. In the mid 1900's, with the advent of advanced electronics such as the transistor, the electrical requirements for portable power sources were drastically reduced. Consequently, cell sizes could also be reduced to include C's, AA's, and AAA's, and even small button cells. This power reduction has continued into the twenty-first century, where applications such as smart labels, smart credit cards, sensors, data loggers, novelty devices such as greeting cards and badges, etc., now require a maximum current of several milliamperes, with many applications requiring as little as a few microamperes at about 1.5-3.0 volts. These applications also have the requirement that the power sources be flat and very thin to maintain their low profiles and portability.

In the past twenty-five years, various approaches for making thin, flat cells and batteries were attempted by numerous scientists and corporations. These include the widely known instant film battery pack developed by Polaroid. This battery pack was used in each package of Polaroid instant film. This allowed Polaroid to have a fresh battery in the camera each time the user placed a new pack of film in the camera. This high cost battery with multiple layers and a metal foil laminate package is a high voltage, high current battery, capable of igniting flash bulbs and powering motors, for example, and is not a realistic competitor of the new thin low cost batteries that are needed. In addition to Polaroid, others have tried to develop thin batteries in various electrochemical systems.

Co-pending U.S. application Ser. Nos. 11/110,202 filed on Apr. 20, 2005 and 11/378,520 filed on Mar. 17, 2006, incorporated herein by reference, discuss new designs and methods of manufacture of a flat cell and battery.

With the growing market needs for low cost, low capacity thin flat cells, it would be beneficial to produce a thin, flat, printable flexible cell that is versatile and inexpensive to mass-produce. Printable, disposable thin cells that are well suited for low-power and high-production volume applications would be useful, especially if they offer adequate voltage, sufficient capacity, and low-cost solutions. Conventional low-profile batteries typically have few of these attributes, if any.

Furthermore, in recent years there has been a growing need for various electronic devices, such as active RFID tags, sensors with RFID tags, skin patches that deliver iontophoretic or other electrical functionality, etc. Therefore, a method for allowing manufacturers to integrate the printing of the desired circuitry of electrical components while mating components to a battery to power the components would be useful. For example, it would be beneficial to apply both an electronic device and its power source to a single substrate. In other words, the electronic device and its power source can share a single substrate to simplify the manufacturing process to provide reduced costs, greater efficiency, and increased economies of scale.

As a result, integrating the printing and assembly of cells and/or batteries with the printing of the electronic device, such as a RFID device, skin patch electrodes, etc. would also be useful to realize such increased economies of scale. Furthermore, a method of manufacture for integrated devices that would help reduce or eliminate expensive assembly of cells/batteries with these applications.

SUMMARY OF THE INVENTION

Provided are a plurality of embodiments for the invention, including, but not limited to, an electrical device comprising an electrical apparatus including: a base substrate having a first side and a second side, an antenna and/or an electrical component provided on the second side of the substrate, and on the first side of the substrate an electrochemical cell and/or battery that is electrically connected to the antenna and/or electrical component on the second side of the substrate, such as by means of through holes, wherein the cell or battery is for providing electrical energy to the electrical apparatus.

In accordance with one aspect of the present invention, a method of manufacturing an active RFID device including a flat electrochemical cell for generating an electrical current is provided. The method including the steps of providing a first substrate and a second substrate. At least one of the first and second substrates includes a plurality of layers, and the first substrate including a first side and a second side. An active RFID assembly is provided on the second side of the first substrate, including a RFID antenna, an active RFID element in communication with the RFID antenna, and a plurality of electrical contacts in electrical communication with the active RFID element. A cathode layer is provided on the first side of the first substrate, and an anode layer is provided on the first side of the first substrate. An electrolyte layer is provided including a viscous liquid in contact with the cathode layer and also in contact with the anode layer. A frame is provided on the first side of the first substrate to form an inner space containing the electrolyte, and also containing at least a major portion of the cathode layer and at least a major portion of the anode layer within the inner space. The cathode layer, anode layer, and the plurality of electrical contacts are electrically coupled, and the second substrate is connected to the first substrate to substantially seal the inner space containing the cathode layer, the anode layer, and the electrolyte layer.

In accordance with another aspect of the present invention, a method of manufacturing an active RFID device including a flat electrochemical cell for generating an electrical current is provided. The method includes the steps of providing a first substrate and a second substrate. At least one of the first and second substrates includes a web having a plurality of layers, and the first substrate includes a first side and a second side. An active RFID assembly is provided on the second side of the first substrate, including the steps of (i) providing an active RFID element on the second side of the first substrate; and (ii) printing an RFID antenna and a plurality of electrical contacts on the second side of the first substrate so as to be in electrical contact with the active RFID element. Each of the RFID antenna and plurality of electrical contacts include a cured or dried ink. A cathode collector layer is printed on a first side of the first substrate. A cathode layer is printed on the first side of the first substrate, and an anode layer is laminated on the first side of the first substrate. An electrolyte layer is provided including a viscous liquid in contact with the cathode layer and also in contact with the anode layer. A frame is provided on the first side of the first substrate to form an inner space containing the electrolyte, and also containing at least a major portion of the cathode layer and at least a major portion of the anode layer within the inner space. The cathode layer via the cathode collector layer, the anode layer, and the plurality of electrical contacts are electrically coupled, and the second substrate is connected to the first substrate to substantially seal the inner space containing the cathode layer, the anode layer, and the electrolyte layer.

In accordance with yet another aspect of the present invention, an active RFID device is provided including a flat electrochemical cell for generating an electrical current. The active RFID device includes a first substrate including of a plurality of laminated layers and defining a first side and a second side, and a second substrate. An active RFID assembly is provided on the second side of the first substrate, including a RFID antenna, an active RFID element in communication with the RFID antenna, and a plurality of electrical contacts in electrical communication with the active RFID element. A cathode layer is provided on the first side of the first substrate, and an anode layer is provided on the first side of the first substrate. An electrolyte layer includes a viscous liquid in contact with the cathode layer and also in contact with the anode layer. A frame is interposed between the first and second substrate to connect and seal the first substrate to the second substrate to form an inner space containing the electrolyte, and also containing at least a major portion of the cathode layer and at least a major portion of the anode layer within the inner space. At least one of the anode layer and the cathode layer include a cured or dried ink. An electrical coupler assembly provides electrical communication between the cathode layer, the anode layer, and the plurality of electrical contacts.

In accordance with still yet another aspect of the present invention, a method of manufacturing an active RFID device including a flat electrochemical cell for generating an electrical current is provided. The method includes the steps of providing a first substrate including a first side and a second side, providing an active RFID assembly on said second side of said first substrate, providing a cathode collector layer on said first side of said first substrate, providing a cathode layer on said first side of said first substrate, and providing an anode layer on said first side of said first substrate. The method further includes the steps of providing an electrolyte layer in contact with said cathode layer and also in contact with said anode layer, and electrically coupling the cathode layer via the cathode collector layer, the anode layer, and the active RFID assembly through the first substrate.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE PREFERRED EMBODIMENTS OF THE INVENTION

Figure 1:
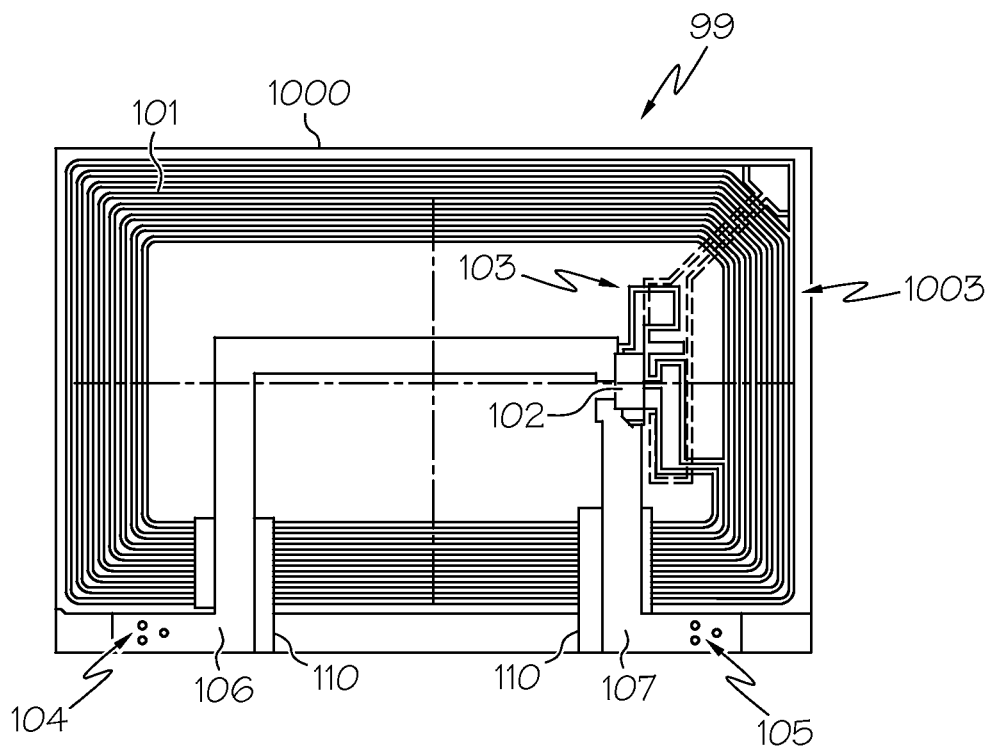
FIG. 1 illustrates an example RFID assembly provided on a second side of an example first substrate.

Generally, the invention is an electronic device and method of manufacturing said electronic device by integrating an electrical circuit, antenna or skin patch electrodes with one or more cells/batteries to power the device. In one example, the method applies both an electronic device and its power source to a single substrate. In other words, the electronic device and its power source can share a single substrate to simplify the manufacturing process to provide reduced costs, greater efficiency, and increased economies of scale. The circuit and a battery are typically printed and/or laminated on a continuous, flexible substrate web, and may be formed into a roll or the like. The individual devices can be removed from the roll, such as one at a time. For example, the devices can be cut from the roll, and/or perforations of the flexible substrate roll can be provided for easy tear off. The apparatus can include one or more electrical components, such as an antenna and/or a processor, for example. The multiple facets of this invention could be used in the total package described and/or they could be used individually or in any combination.

As used herein, unless otherwise explicitly indicated, all percentages are percentages by weight. Also, as used herein, when a range such as "5-25" (or "about 5-25") is given, this means, for at least one embodiment, at least about 5 and, separately and independently, not more than about 25, and unless otherwise indicated, ranges are not to be strictly construed, but are given as acceptable examples. Also herein, a parenthetical range following a listed or preferred value indicates a broader range for that value according to additional embodiments of the invention.

The present invention relates to thin, printed electrochemical cells and/or batteries comprising a plurality of such cells. Such cells each typically include at least a first electrode including a first electrochemical layer (e.g., a cathode), a second electrode including a second electrochemical layer (e.g., an anode), and an electrolyte that interacts with the electrodes to create an electrical current. All of the first and second electrodes and the electrolyte are typically contained within some structure which provides an external electrical access to the electrodes for providing an electrical current supply to some device.

One method of mass-producing such cells includes depositing aqueous and/or non-aqueous solvent inks and/or other coatings in a pattern on a special substrate, such as a laminated polymeric film layer, for example. The depositing can be by means of, for example, printing electrochemical inks and/or laminating a metallic foil, such as a zinc foil, for example, on one or more high-speed web printing presses, especially if the desired volumes are very high. If volumes are relatively lower, say in the quantities of only about several million or less, then relatively slower methods such as web printing with flat bed screens could be appropriate. If the volumes are even lower, such as hundreds or thousands, then a sheet-fed flat bed printing press may be utilized, for example. Still, various printing methods can be used for various desired quantities.

After the inks are printed and/or the solids have been properly placed, the cells can be completed (e.g., sealed, die cut, stacked and/or perforated and wound into a roll, or stacked if sheets are used on a printing press). This cell manufacturing process can also be utilized for integrating one or more individual cells with an actual electronic application, or into batteries comprising multiple cells connected in series or parallel, or some combination of the two. Examples of such devices and corresponding processes will be described later, but many additional embodiments are also contemplated.

As discussed above, the invention may be described as a printed, flexible, and thin electrochemical cell. Such a cell can include, for example, a lower film substrate that can utilize a special polymer laminate that has special features, possibly including, for example, a high moisture barrier layer in the center that is surrounded by polymer films on both sides. Furthermore, one or both outside surfaces can be made to be print receptive for printing information, logos, instructions, identifications, serial numbers, graphics, or other information or images, as desired.

Depending on which construction of this invention is used, the inner ply of the substrate could also feature a heat-sealing layer that might be co-extruded on the side opposite the barrier coating.

In addition, a portion of the inner surface of a lower substrate layer of a cell of at least some embodiments could utilize a cathode current collector, such as carbon, for example, printed or coated or otherwise applied on a portion of the film substrate. At an outside contact area of this collector can also be printed a layer of a relatively highly conductive ink, such as silver, nickel, or tin, for example, to improve the conductivity to the application connection, if desired. However, if the battery application is used for relatively low current requirements, then the higher conductive layer material, or even the current collector, may not be utilized for one or both electrodes.

For at least some embodiments, a water-based ink electrochemical layer is printed as the cathode. Such a cathode layer can include, for example, manganese dioxide ($MnO_2$), carbon, and a polymer binder. Other formulations for the cathode layer can also be utilized with or without any of these materials. If a cathode collector layer is used, which may or may not form a portion of the cathode layer, the cathode electrochemical layer will be printed on at least a portion of the cathode current collector, which is printed or otherwise applied first to the substrate.

In some embodiments, adjacent to the cathode collector, at a spacing of about 0.050", can be placed a narrow strip of zinc foil as the anode. Other anode compositions are also possible, such as an ink layer including zinc or some other proper material, for example.

Prior to this anode placement, in an off-line operation, a dry-film adhesive layer, possibly using a release liner, can be applied to the zinc foil. The zinc foil can then be laminated to the base substrate.

Optionally, printed over one or both the anode and cathode, is a starch ink or similar material. The starch ink can act as an electrolyte absorber to keep the electrodes "wet" after an aqueous electrolyte solution is added to the cell. This starch ink could also include the electrolyte salts and the water used for the cell reaction. A paper layer over the anode and cathode could be used in place of the printed starch.

For some embodiments, after the two electrodes are in place, with or without the starch layer(s), a cell "picture frame" can be added. This could be done using a number of different methods. One method is to print this cell picture frame with a dielectric ink, for example. Another method is to utilize a polymer sheet or a laminated polymer sheet that includes adhesive layers, that is stamped, die cut, laser cut or similar methods to form the appropriate "pockets" (inner space or spaces) to house materials of each unit cell.

To ensure good sealing of the picture frame to the substrates, and to provide good sealing of the contact feed-throughs (providing an electrical pathway from the cell inside to the cell exterior), a sealing or caulking adhesive could be printed on the substrate, such as in the same pattern as the cell frame, for example, prior to the frame being printed or prior to the polymer sheets being inserted, for example.

This sealing or caulking material could be pressure sensitive, and/or heat sensitive, for example, such as Acheson Colloids' PM040, for example, or any other type of material that would facilitate sealing to both surfaces.

After the dielectric picture frame is printed and dried and/or cured, a heat sensitive sealing adhesive can be printed on top of the frame to allow good sealing of the top substrate to the cell frame. This cell picture frame could also comprise a polymer film or a laminated film of about 0.015" thick (range of about 0.003"-0.050") that is pre-punched and then laminated in registration to match the preprinted caulking adhesive layer described above.

Zinc chloride ($ZnCl_2$) can be chosen as the electrolyte, for at least some embodiments, in the concentration range of about 18%-45% by weight, for example. In one example, about 27% may be preferred. The electrolyte can be added, for example, to the open cell. To facilitate processing on the line, this electrolyte, or a different electrolyte, could be thickened with, for example, CMC at about a level of about 0.6 wgt % (range of about 0.05%-1.0%).

Other useful electrolyte formulations, such as ammonium chloride ($NH_4Cl$), mixtures of zinc chloride ($ZnCl_2$) and ammonium chloride ($NH_4Cl$), zinc acetate ($Zn(C_2H_2O_2)$), zinc bromide ($ZnBr_2$), zinc fluoride ($ZnF_2$), zinc tartrate ($ZnC_4H_4O_6.H_2O$), zinc per-chlorate $Zn(ClO_4)_2.6H_2O$), potassium hydroxide, sodium hydroxide, or organics, for example, could also be used.

Zinc chloride may be the electrolyte of choice, providing excellent electrical performance for ordinary environmental conditions normally encountered. Likewise, any of the above mentioned alternative electrolytes, among others, could be used in concentrations (by weight), for example, within the range of about 18%-45%, with the range of about 25%-35% used for at least some other embodiments. Such compositions could also provide acceptable performance under ordinary environmental conditions.

The use of electrolytes other than of zinc chloride can provide improved cell/battery electrical performance under some differing environmental conditions. For example, about 32% by weight zinc acetate (F.P.—freezing point—about 28° C.) exhibits a lower freezing point than about 32% by weight zinc chloride (F.P. about −23° C.). Both of these solutions exhibit a lower freezing point than of about 27% zinc chloride (F.P. about −18° C.). Other zinc acetate concentrations, e.g. about 18-45 or about 25-35 weight percent, also exhibit reduced freezing points.

Use of such electrolyte formulations as substitutes for zinc chloride, or in various mixtures used in cells, can allow for improved performance at low temperatures. For example, it has been found that the use of an about 32% zinc acetate electrolyte substantially improves low temperature (i.e. below about −20° C.) performance of a voltaic cell. This type of electrochemical cell performance improvement at low temperature can be utilized in the growing business of battery assisted RFID tags, for example, and/or other transient (transportable) electrically operated devices, such as smart active labels and temperature tags, for example, which may be used in cold environments.

For example, many products that are shipped today, such as food products pharmaceuticals, blood, etc, may require low temperature storage and shipping conditions, or even low temperature operation. To ensure safe shipment of such goods, these items can be tracked with active RFID tags and/or sensors. These tags and/or labels might require electrochemical cells and/or batteries to operate effectively at temperatures at, or even below, −20° C., such as at about −23° C., about −27° C., or even at about −30° C. or less.

When zinc acetate is used to achieve improved low temperature performance for low temperature applications, the zinc acetate concentration in the range of about 31-33, is often acceptable, although ranges of about 30-34, about 28-36, about 26-38, and even about 25-40, weight percent, could also be utilized.

In at least one embodiment, the construction of the printed starch layer with the addition of the aqueous electrolyte could be replaced, for example, by a printable viscous liquid (which could include a gel, or some other viscous material) that effectively covers at least a portion of each electrode. One such printable gel is described in United States Patent Publication 2003/0165744A1, published on Sep. 4, 2003, and incorporated herein by reference. These viscous formulations could, for example, utilize the electrolyte formulas and concentrations previously discussed.

The upper substrate of a cell package could utilize a special laminated polymeric film, which has an edge that extends beyond the internal cell/battery components onto the cell frame. The upper layer is sealed around the edges of the cell frame by means of a pressure sensitive adhesive (PSA), and/or with the heat sensitive sealing adhesive that was previously printed, thus confining the internal components within the cell frame.

The above-described constructions can be wet cell constructions; however, using a similar cell construction, the present invention could be also be made into a reserve cell construction, which has the benefit of providing extended shelf life prior to the application of a liquid. The printable, flexible, zinc chloride thin cell can be made environmentally friendly. Such a construction could be utilized which does not require the use of harmful components, such as mercury or cadmium, for example. Old and/or depleted cells of this design could thus be disposed using regular waste removal procedures.

The devices for which this technology can be used are extensive. Devices that utilize relatively low power or a limited life of one to three years, and possibly longer, could function utilizing a thin cell/battery according to the invention. The cell of the invention, as explained in the above paragraphs and below, can often be inexpensively mass-produced so that it can be used in a disposable product, for example. The low cost allows for applications that previously were not cost effective.

The electrochemical cell/battery according to the invention might have one or more of the following advantages:
Relatively thin;
Flat, and of relatively uniform thickness, where the edges are of about the same thickness as the center;
Flexible;
Many geometric shapes are possible;
Sealed container;
Simple construction;
Designed for high speed and high volume production;
Low cost;
Reliable performance at many temperatures;
Good low temperature performance;
Disposable and environmentally friendly;
Both cell contacts provided on the same surface;
Ease of assembly into an application; and
Capable of being easily integrated in a continuous process at the same time that the electronic application is being made.

The above was a general description of various cell constructions according to some embodiments of the invention, and further details utilizing drawings follow below. Cell and battery production processes for cell printing and assembly also will be described as well.

Generally, RFID (radio frequency identification) tags are readily known in the art. In one illustrative embodiment, each RFID tag may include a unique code that specifically identifies it. Illustrative information provided by each RFID tag may include, e.g., an identifier, a serial number, a part type, manufacturer information, etc.

Within the context of this disclosure, an RFID tag may be an electronic circuit adapted to receive incoming radio frequency energy through its antenna, and operate that circuitry to modulate a radio frequency signal to transmit data out through the antenna. The RFID tag can be passive such that it uses a portion of the incoming radio frequency energy to power its own circuitry, or alternatively the RFID tag can be active such that it is coupled to a power source that at least partially powers its own circuitry. However, an active RFID tag can still utilize a portion of the incoming radio frequency energy to power its own circuitry. An RFID tag may also contain circuitry to perform additional operations, such as logic circuitry, memory, sensors, etc. The RFID tag may use any feasible RFID technology currently existing or yet to be developed.

In one example, such as where relatively high speed, high output manufacturing is contemplated, such as 50 linear feet per minute or another relatively high speed, the invention can utilize multiple webs. It is to be understood that the multiple webs can be generally continuous, and can be utilized with known web manufacturing equipment. A first web can be relatively thin, such as ~0.002"-0.010" and preferably about 0.003-0.006", flexible base substrate including a multi-ply laminated structure or single ply material. In one example, the multi-ply structure can include five layers. Alternatively, the single ply material can include various materials, such as Kapton or polyester. A second web can be a relatively thick laminated structure including a PVC or Polyester film that is about 0.005-0.030" thick, and preferably about 0.010-0.015" thick. The second web can have a layer of pressure sensitive adhesive at about 1-5 mils thick on one side. After this laminated structure of the second web is completed, it can be applied to the first web. In addition or alternatively, the second web can be pattern cut using any type of mechanical means to allow for cavities for the cells active materials as well as an optional cavity for the cell/battery contacts. A third web can be a relatively thin laminated structure the same and/or similar to the first web. The completed three web structure may have a pressure sensitive adhesive on either side to allow the individual device assembly to be applied as a label. The cell/battery may be of the thin cell type, such as disclosed in co-pending application Ser. No. 11/110,202, filed on Apr. 20, 2005 and incorporated herein by reference, and/or the cells disclosed in co-pending application Ser. No. 11/378,520, filed on Mar. 17, 2006, and also incorporated herein by reference.

The various conductive inks described herein could be based on many types of conductive materials such as carbon, silver, nickel, silver coated copper, copper, silver chloride, zinc and/or mixtures of these. For example, one such material that shows useful properties in terms of conductivity and flexibility is Acheson Colloids (Port Huron, Mich.) PM046. Furthermore, many antennas that might be part of the printed circuitry can be made by etching aluminum, copper or similar type metallic foils that are laminated on a polymer such as Kapton substrate. This could be done with many types (sizes and frequencies) of antennas whether they are etched or printed. As will be discussed herein, this can be beneficial for the use of etched foil antennas, though other variants are also contemplated.

Turning now to FIG. 1, a second side 1003 of a first substrate 1000, can be the base substrate of an electronic device 99, such as an RFID assembly, an integrated circuit, a semi-conductors, various electronic components, etc. In one example, the electronic device 99 can include an RFID device having an RFID antenna and chip assembly including antenna coils 101, a IC chip 102 that uses a power source, and/or many other features and circuitry 103 that may be desired for an active RFID application. The RFID assembly 99 can also include various associated circuitry, such as a time/temperature sensor, memory, etc. As will be discussed more fully herein, the various elements of the RFID assembly 99 can be printed on the first substrate 1000, including the IC chip 102. However, the IC chip 102, or even various other components of the RFID assembly 99, can be provided in various other manners. For example, the IC chip 102 can be coupled to the first substrate 1000 using "flip chip" structure (i.e., controlled collapse chip connection), and/or straps or interposers, or the like. Moreover, the IC chip 102 can be provided to the first substrate 1000 before, during, or even after the other structure of the RFID assembly 99, such as the antenna coils 101.

The RFID assembly 99 can also include a negative contact 106 and a positive contact 107, for electrical coupling to a power source (see FIG. 2), located on a second side 1003 of the first substrate 1000. As discussed previously herein, the first substrate can be a single layer of Kapton, or preferably a multi-ply (such as five ply) laminated polyester structure. The power source negative contact 106 as well as the positive contact 107 can include a plurality of apertures, such as a set of through-holes 104 and 105 (or vias, electrical jumpers, etc.), respectively, to make contact to the power source, which can be a cell an/or battery which is assembled on the second side of the base substrate. To avoid shorting of the contacts to the antenna coils 101 with contacts 106 and 107, dielectric pads 110 can be provided, such as printed, over the antenna coils 101 where the contacts cross over the coils. Moreover, as shown in FIG. 2A, the RFID assembly 99 can be sealed in various manners, such as by a printed or laminated top layer 4000 or the like.

As described herein, a 3 volt battery is obtained by connecting two 1.5 volt unit cells in series, although other voltages and/or currents can be obtained by using unit cells with different voltages and/or by combining different numbers of cells together either in series and/or in parallel. Thus, applications using greater voltages can connect unit cells in series, whereas applications using greater currents can connect unit cells in parallel, and applications using both can utilize various groups of cells connected in series further connected in parallel. Thus, a variety of applications that use different voltages and currents can be supported using a variety of unit cell and/or battery configuration.

Figure 2:
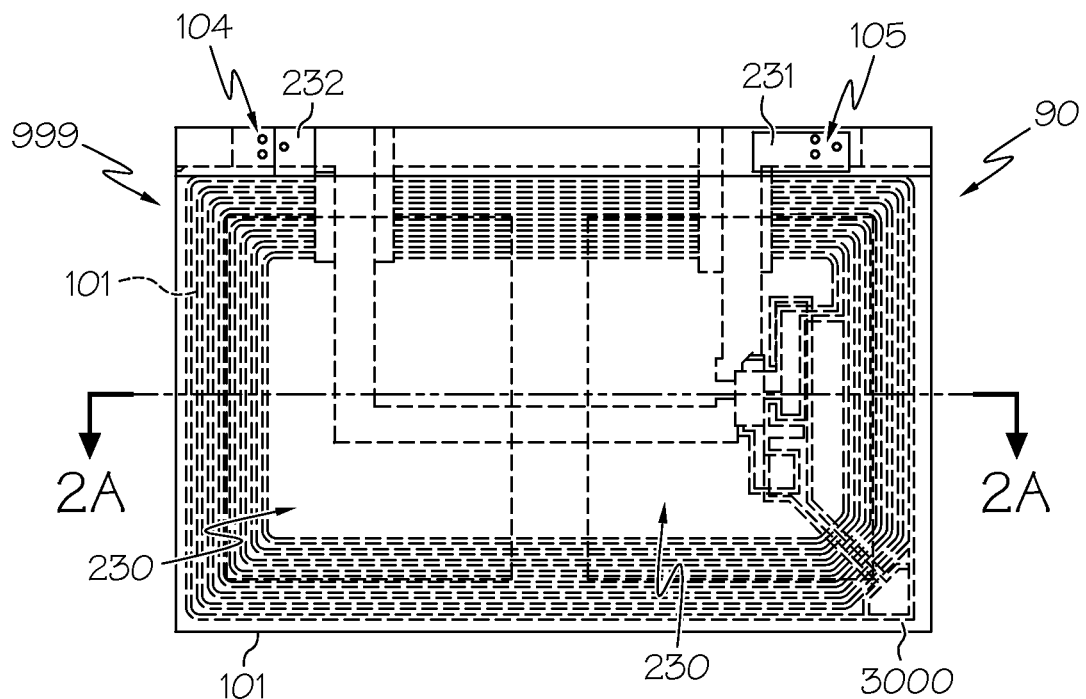
FIG. 2 illustrates an example power source located on a first side of the first substrate.

Turning now to FIG. 2, a completed RFID device 999 is illustrated. It is to be understood that FIG. 2 is similar to FIG. 1, but illustrates the other side (i.e., oriented upside-down) of the completed integrated powered electrical device (i.e., RFID device) 999. In other words, FIG. 2 illustrates the first side 1001 of the first substrate 1000 that is shared by each of the RFID assembly 99 and the power source 90 share (i.e., the shared substrate). FIG. 2 also illustrates a top side of a second substrate 3000 of the RFID assembly 99. The second substrate 3000 is coupled to the first substrate 1000 to substantially seal an inner space containing one or more cells 230 to form the battery power source 90. For example, the cells 230 can include a negative contact 232, battery positive contact 231, battery seals 250, and/or various other components. The integrated electronic device also shows the antenna items described in FIG. 1 (in hidden lines for reference) and is completed by connecting the battery contacts 232 and 231 to the antenna power source contacts 106 and 107 by means of filling the through holes 104 and 105, such as with a conductive ink or the like.

Figure 2A:
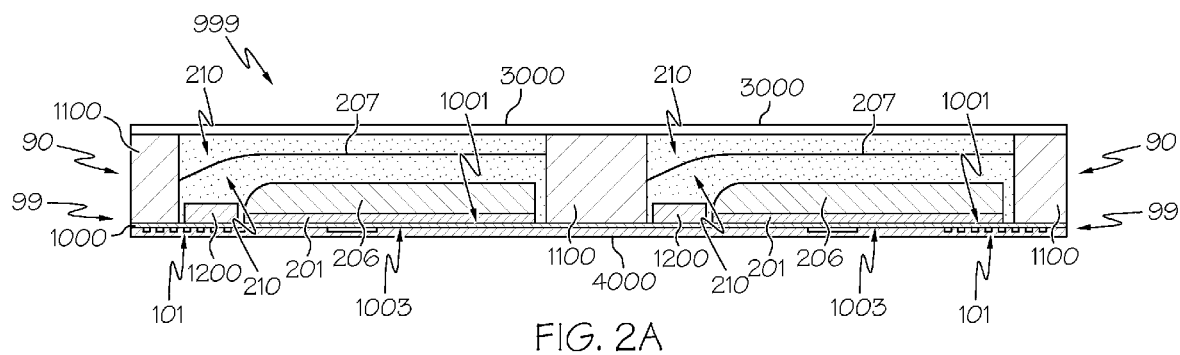
FIG. 2A illustrates a cross section view of the unit cell taken through line 2A-2A of FIG. 2.

Turning now to FIG. 2A, a cross section view of the completed RFID device 999 is illustrated taken through line 2A-2A of FIG. 2. It is to be understood that the RFID assembly 99 can share the same first substrate 1000 as the battery 90. For example, as shown, the battery 90 can be located on a first side 1001, while the RFID assembly 99 can be located on a second side 1003. The thickness of the completed RFID device 999 can generally be determined as a sum of the thicknesses of all of the various layers and elements. In one general example, the thickness of the RFID device 999 can be about 0.030" (about 0.020"-0.040"), though various other thicknesses are contemplated. The thickness can be generally uniform, or can vary depending upon the relative thicknesses of the various elements contained therein. Moreover, the completed active RFID device 999 can have various geometries, such as circular, triangular, square, rectangular, other polygonal shape, random, etc. The first substrate 1000 acts as the base substrate for the active RFID device 999.

Figure 3:
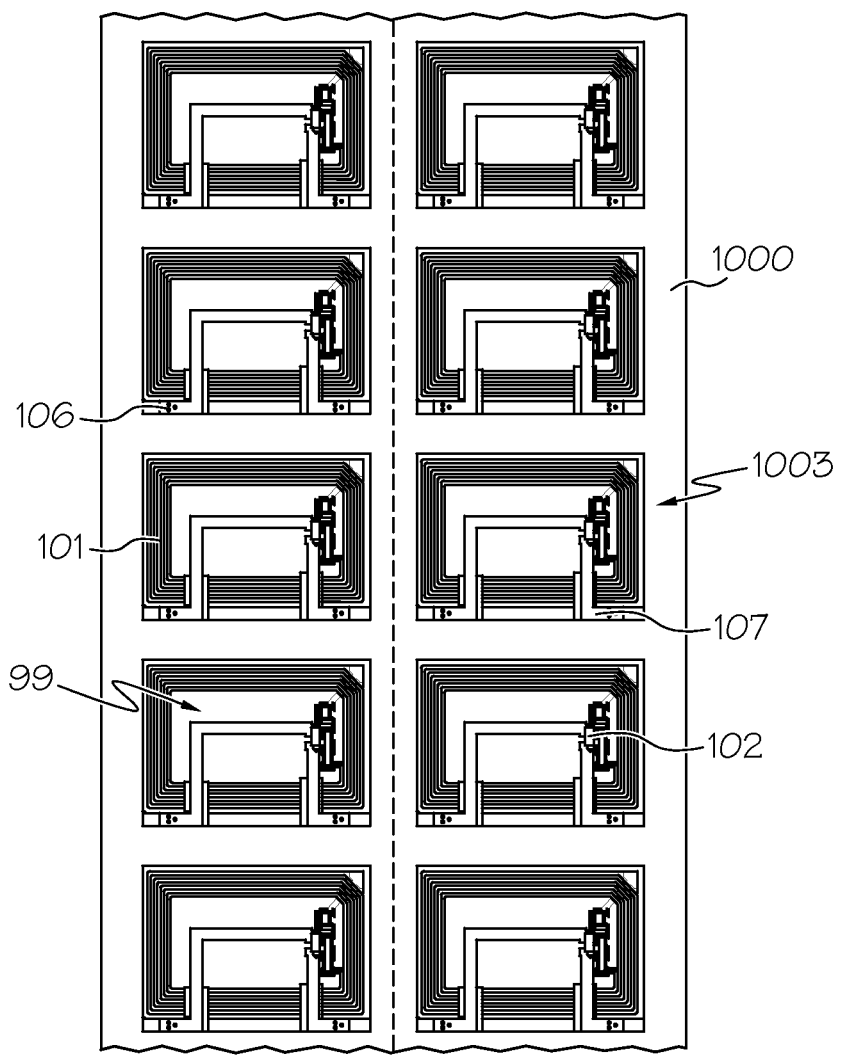
FIG. 3 illustrates a plurality of RFID assemblies provided on a second side of a first substrate web.

Turning now to FIG. 3, the second side 1003 of the first substrate 1000 is illustrated having a plurality of RFID assemblies 99 thereon, including the antenna coils 101, the chip 102, and the battery contacts 106 and 107. As described above, the IC chip 102 can be provided to the first substrate 1000 before, during, or even after the other structure of the RFID assembly 99, such as the antenna coils 101. After the antennas 101 are provided on the second side 1003 of the first substrate 1000, the first substrate 1000 can then be turned or flipped over using various means, such as a turn-bar arrangement or the like, and the various power source components, as will be described more fully herein, can be printed with functional inks ink, and/or laminated in place as shown in FIG. 2, on the first side 1001 of first substrate 1000.

Figure 4:
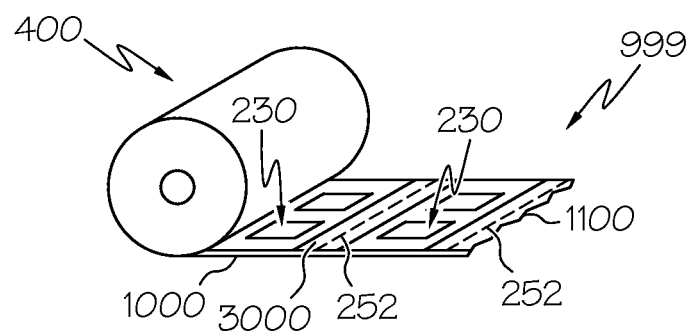
FIG. 4 illustrates a plurality of completed RFID devices stored on an example roll.

Turning now to FIG. 4, a plurality of completed integrated electronic devices 999 are illustrated a roll 400 that is partially unwound. The unwound portion shows the top view of second substrate 3000 of the integrated 3 volt battery/electronic device. Various other elements, such as the cells 203 and device perforation lines 252 are shown, thus the spacing of the integrated devices can also be seen.

Figure 5:
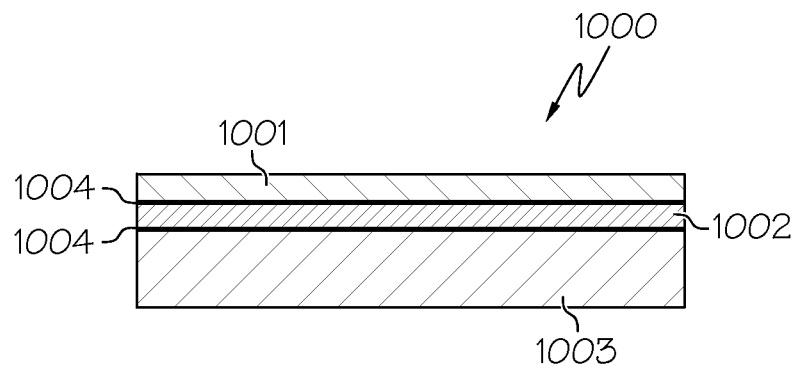
FIG. 5 illustrates a partial sectional view of the first substrate.

Turning now to FIG. 5, a partial sectional view of first substrate 1000 is illustrated. The first substrate 1000 can include various layers, such as five layers. For example, the various layers of first substrate 1000 can include three plies of film, and two layers of a UV cured urethane laminating adhesive 1004 which can be relatively thin, such as about 0.2 mils thick, with a range of about 0.1-0.5 mils. In one example, this laminated structure can be supplied by Curwood Inc., a Bemis Corporation Company of Oshkosh, Wis. The top film layer 1001 can be a heat sealable layer, such as provided by DuPont (OL series), on the inside of the cell and can have an example thickness of about 0.00048" thick (e.g., about 0.0002"-0.002"). The middle film layer 1002 can be a high moisture barrier polymer layer such as the GL films supplied by Toppan of Japan. Typically, this polyester film can have an oxide or metalized coating on the inside of the laminated structure. This coating could have varying moisture transmission values depending on the type and the amount of vacuum deposited oxides, or metals. The third film layer 1003, can be a polyester layer 1003 that can act as a structural layer. This structural layer 1003 of the five ply layer structure of FIG. 5 can be orientated polyester (OPET) and have a thickness of about 0.002" (e.g., about 0.0005"-0.010"), which can also be laminated to the other layers by means of a urethane adhesive 1004 that is about 0.1 mil thick, for example. This "structural layer" can be a DuPont polyester orientated (OPET) film such as their Melinex brand, for example. Another material that can be used is from Toyobo Co. Ltd. of Japan, which is polyester based synthetic paper, which is designated as white micro-voided orientated polyester (WMVOPET).

Depending on the cell construction, the cell application, and/or the cell environment, it may be advantageous to have different barrier properties for the substrate. Due to the wide range of available vapor transmission rates available, the barrier layer can be chosen for each specific application and construction, as desired. In some cases, for example where the cell by design has a higher gassing rate short life cycle, it may be appropriate and desirable to use a film with a higher transmission rate to allow for a larger amount of gas to escape, so as to minimize cell bulging. Another example would be an application that is in a hot dry environment such as a desert. In such cases, it may be desirable to have a barrier film with low transmission rates to prevent excessive moisture loss from the batteries.

The use of a thicker substrate, by increasing any or all of the polymer thicknesses, may have some advantages: These may include one or both of the following:

The cells process better on printing press due to the thicker substrate being less temperature sensitive; and The cell package is stiffer and stronger.

In addition to the above specifications, both the outside and the inside layers could include the addition of a print-receptive surface for the inks. The inside layer is used for the functional inks (such as the collector and/or electrochemical layers) while the outside layer can be used for graphical inks, if desired. Flat cell constructions having a sealed system might utilize a laminated structure that includes metallized films and/or a very thin metal foil or foils as a moisture barrier. Although such structures using a metal layer might have better moisture barrier properties than the constructions used for some of the above described embodiments, it might also have some disadvantages. These may include one or more of the following:

Laminated structures with metal barriers (thin metal foil or a vacuum metallized layer) are likely more expensive;

Laminated structures with metal layers have the possibility of causing internal shorts; and Laminated structures that include a metal barrier could interfere with the electronics of an application, such as the functionality of a RFID antenna, for example.

The various substrates of FIGS. 1-4, and even layers of other figures, can be comprised of numerous variations of polymeric film, with or without a barrier layer (including metal or other materials), and can utilize either mono-layer or multi-layer films, such as polyesters or polyolefin. Polyester is a good material to utilize because it provides improved strength permitting use of a thinner gauge film and is typically not easily stretched when used on a multi-station printing press. Vinyl, cellophane, and even paper can also be used as the film layers or as one or more of the layers in the laminated constructions. If a very long shelf life is desired, and/or the environmental conditions are extreme, the multi-ply laminates could be modified to include a metallized layer such as obtained by vacuum deposition of aluminum in place of the oxide coating 1104.

Alternately, a very thin aluminum foil could be laminated within the structure of the film layer, or even in a different position. Such a modification could reduce already low water loss to practically nil. On the other hand, if the application is for a relatively short shelf life and/or a short operating life, a more expensive barrier layer could be replaced with a less efficient one that would be of a lower cost and still allow the cell to function for the desired lifetime.

In applications where only an extremely short life is desired, the cell package could instead use a film layer of a low cost polymer substrate such as polyester or polyolefin. It is possible that the pressure sensitive adhesives for coupling and/or sealing the various substrates together could be replaced with a heat sealing system on the laminates. For example, a heat sealing coating or the like could be used, such as amorphous polyester (APET or PETG), semi crystalline polyester (CPET), polyvinyl chloride (PVC), or a polyolefin polymer etc. on polymer film such as polyester. One such example material is the Ovenable Lidding (OL) films made by Dupont and designated as their OL series such as OL, OL2 or OL13.

Figure 6:
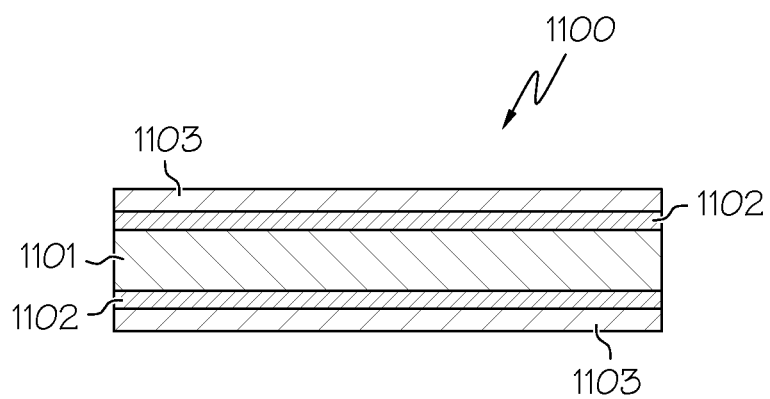
FIG. 6 illustrates a partial sectional view of an example spacer.

Similar to FIG. 5, FIG. 6 illustrates a partial sectional view of a third substrate 1100 that can be utilized as a spacer frame. The third substrate 1100 can be composed of various materials, such as PVC or PET film 1101 at about 0.002"-0.030" thick and preferably at about 0-0.005"-0.015" that is sandwiched between (i.e., interposed between) two layers to a pressure sensitive adhesive (PSA) 1102 that is about 0.003" thick (0.001"-0.005") and includes a release liner 1103. In addition or alternatively, as shown, the third substrate 1100 can be configured with double-sided adhesive such that the adhesive layer 1102 is located on both sides of the film layer 1101.

Figure 7:
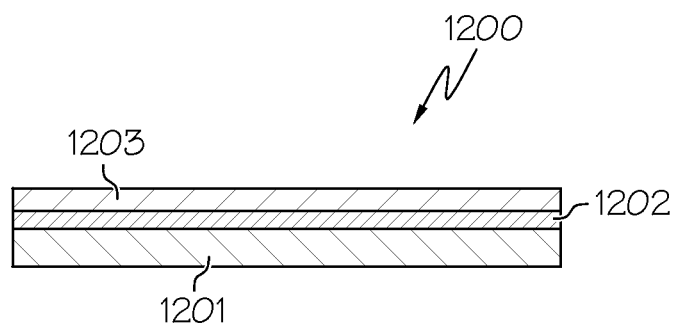
FIG. 7 illustrates a partial sectional view of an example anode layer.

FIG. 7 illustrates a partial sectional view of an example anode assembly 1200, as will be discussed more fully herein. The anode assembly 1200 can include various materials, such as zinc foil 1201 at about 0.0015"-0.005" thick and preferably at about 0.002" that is laminated to a pressure sensitive adhesive (PSA) 1202 that is about 0.003" thick (0.001"-0.005") and includes release liner 1203.

Figure 8:
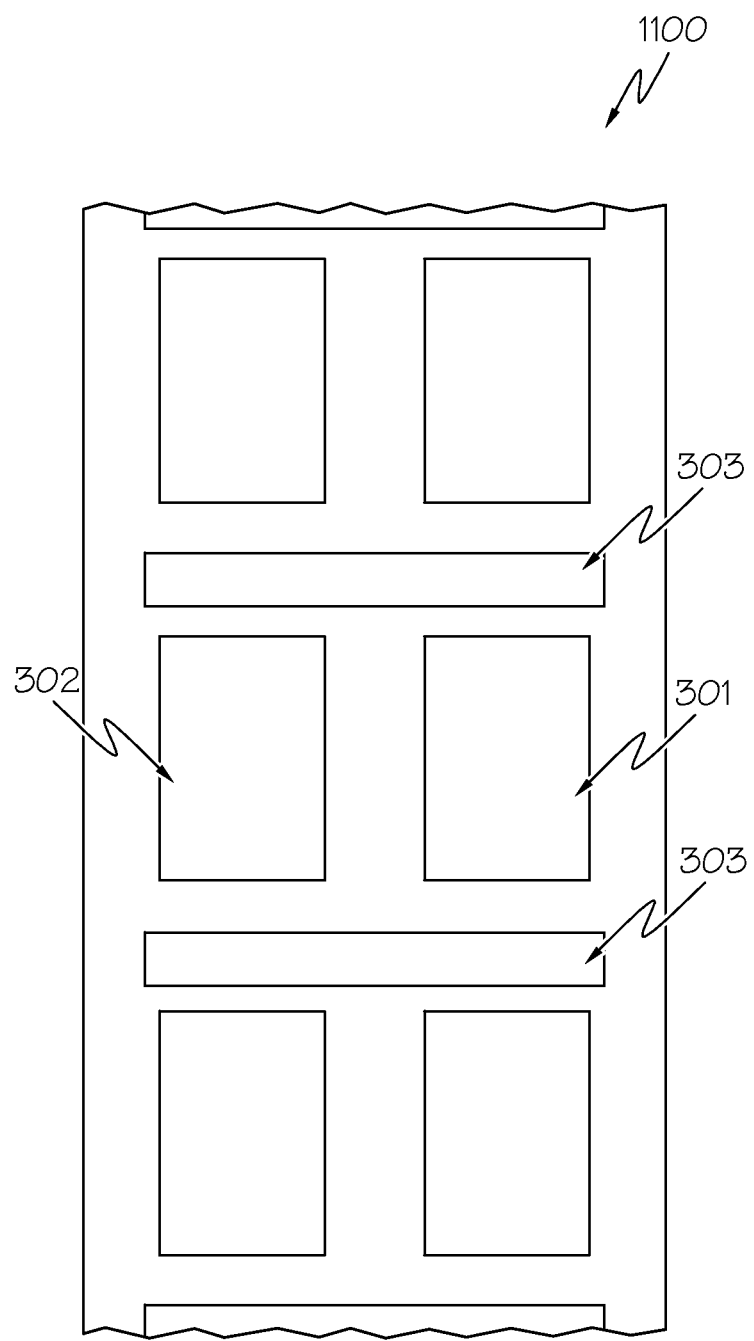
FIG. 8 illustrates a top view of an example spacer web.

FIG. 8 is a top view of the third substrate 1100 of FIG. 6 and is shown as a web. The third substrate 1100 can include example cutout cavities 301 and 302 that can be utilized for the active materials for unit cells 501 and 502, respectively. The third substrate 1100 can also include other cutout cavities 303, such as for the cell and battery contacts 303. The cavities 303 are optional, however, for this description of this integrated electronic device/battery application the various contact cavities 301, 302, 303 will be shown for clarity.

To make the manufacturing process of a cell/battery more efficient and/or achieve greater economies of scale, such as via production at high speeds and low cost, the processing and assembly could be integrated with the manufacture of an electronic component (for example, one to be powered by the battery or cell). In other words, the completed electronic application with the power source can be manufactured at the same time. An example integrated procedure is illustrated in the flow diagram of FIG. 9 and is described in the following paragraphs. In this example procedure, the integrated electronic device proceeds through numerous stations that are compatible with a high-speed printing press running a roll-to-roll setup.

According to available printing presses, the cells could be made with one pass, or multiple passes, on a given press, for example. The various drawings illustrate, as an example, two rows of cells to make a 3 volt battery on the web; however, the number of rows is limited only to the size of the unit cells and the maximum web width that the press can process. Because there may be numerous steps, thereby likely utilizing a long and complicated press, some of these steps, as well as some of the materials, could be modified and/or multiple passes of a press or multiple presses could be used. Some modified process summaries will be shown after the initial discussion is completed. Moreover, any or all of the printing steps can be performed by screen printing, such as by flat bed screens or even rotary screen stations. Additionally, one skilled in the art would realize that one printing press with more than ten stations could be difficult to find and or to operate, and thus the following discussion of the process could occur on one or more presses or even multiple passes through one press.

Figure 9:
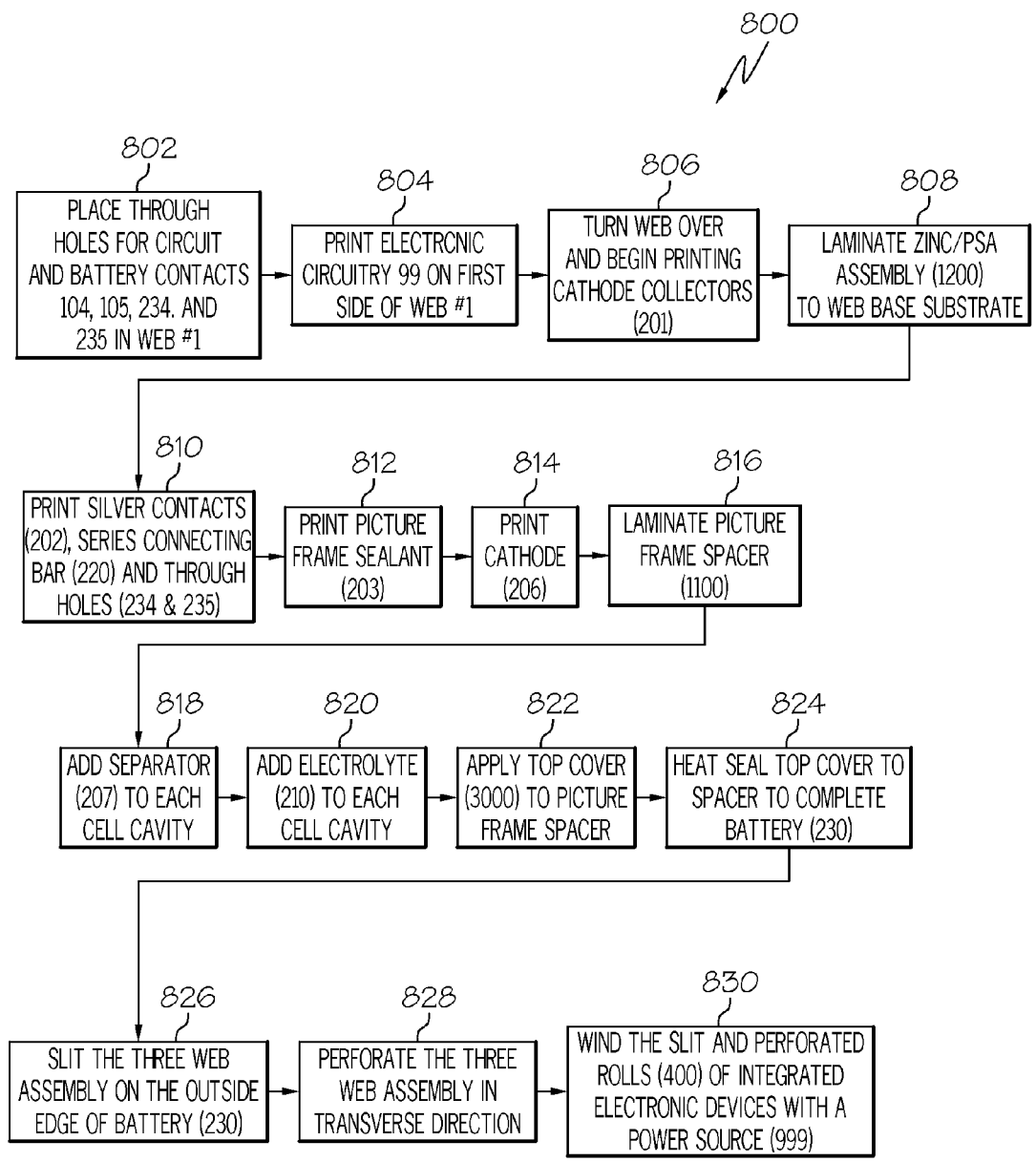
FIG. 9 illustrates a flow diagram of one example method of manufacturing the example RFID device.

However, before the cell/battery is processed as shown in FIG. 9, various optional operations may or may not occur. For example, the optional operations could include one or both of heat stabilization of the web and graphics printing (which could include logos, contact polarities, printing codes and the addition of registration marks on the outside surface of web). If these optional printing operations occur on the web, then the web can be turned over and the functional inks are printed on the inside surface, which may then become an outside laminate (i.e., outside surface).

One skilled in the art would realize that there are many methods, materials, and sequences of operations that could be used to accomplish this invention, and that more or less, similar or different, numbers of stations could also be utilized. For purposes of brevity, the integrated process 800 will be discussed with the manufacture of an active RFID device 999 and/or power-assisted passive RFID tag. Still, it is to be understood that the following process 800 can also be utilized for the manufacture of various other integrated electronic devices. Further, for the purposes of clarity only one column of devices (RFID assembly 99 using a 3 volt power source) will be described and illustrated with the understanding that such description can similarly apply to other columns. Moreover, it is to be understood that any or all of the following elements can include any of the various materials, chemical compositions, etc. described throughout this document. Additionally, the various steps as shown in the process 800 of FIG. 9 are intended to be merely example steps, and it is to be understood that the steps can include various other steps, alternatives, etc. as discussed herein, any or all of which may differ from those example steps shown in FIG. 9.

As shown in FIG. 9, the integrated process 800 can begin with a heat stabilized first substrate 1000 having a plurality of completed or partially completed RFID assemblies 99 thereon. For example, while FIG. 3 shows a partial web with two columns of antennas 101, the width of the web and the number of columns of antennas 101 thereon can vary, and may depend on the printing press capabilities and the widths of the electronic device and its associated cell or battery. As discussed previously herein, the first substrate 1000 can be provided to the process 800 with any or all of the RFID assembly 99. In addition or alternatively, any or all of the RFID assembly 99 can be provided to the first substrate 1000 at various stages of the process 800. However, for the purposes of this example, the active RFID component, such as the IC chip 102, will be assumed to be provided on the second side 1003 of the first substrate 1000.

The process 800 includes the first step 802 of providing an electrical coupler assembly to provide electrical communication between the cathode layer 206, such as via the cathode collector 201, the anode layer 1200, and the plurality of electrical contacts 234, 235. In one example, apertures or through holes 104, 105 can extend through the first substrate 1000. The through holes 104, 105 can be located in registration where the antenna 101 and battery contacts 234, 235 will be on first substrate 1000. Various numbers of through holes 104, 105 can be provided for each contact, such as between one and five holes. Three holes 104, 105 for each battery contact 234, 235 are illustrated. The number, location, and/or spacing of the various holes 104, 105 may depend on the application and materials of construction. The holes 104, 105 could be made by several methods such as punching, laser cutting, etc. Moreover, it is to be understood that various other alternatives to the holes 104, 105 can be employed. For example, vias, electrical jumpers, or the like can also be used together with, or as alternatives to, the holes 104, 105. Such alternatives can be correspondingly provided in step 802.

After the through holes 104, 105 and their registration system are in place are in the web, the next step 804 provides that the antennas and circuitry can be printed on the second side 1003 of the first substrate 1000. An alternative process could begin with a conductive circuit, such as a metallic-flex circuit, on side one of first substrate 1000, thereby eliminating the need to print the antenna and circuitry and to turn over first substrate 1000. Example metallic-flex circuits can include an aluminum-flex or copper-flex circuit, etched aluminum, etc.

After the antennas 101 are provided on the second side 1003 of the first substrate 1000, the next step 806 provides that the first substrate 1000 can then be turned or flipped over using various means, such as a turn-bar arrangement or the like, and the various power source components, can be provided on the first side 1001 of first substrate 1000.

Figure 10:
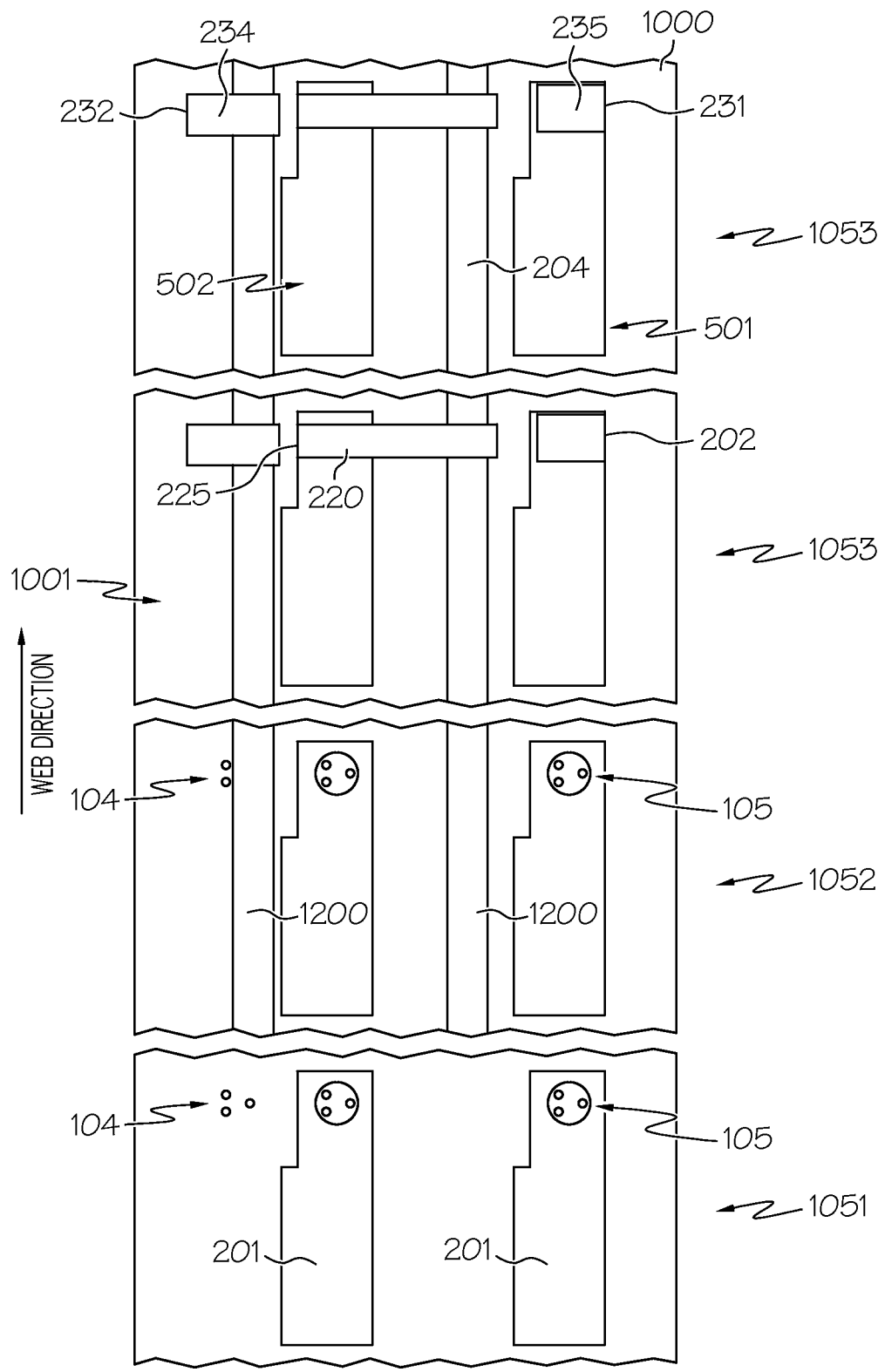
FIG. 10 illustrates a plurality of example steps of the method of FIG. 9.
Figure 11:
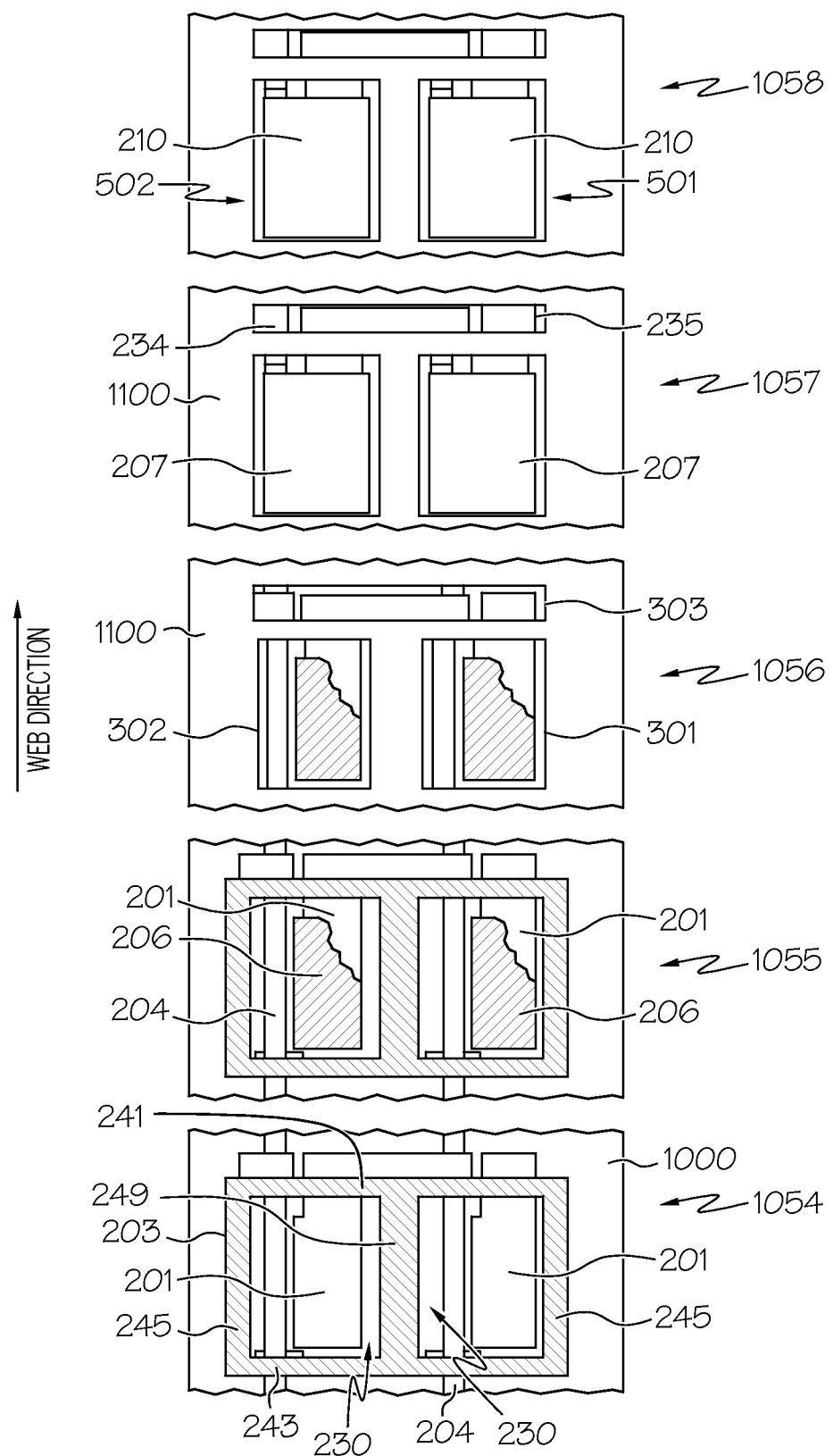
FIG. 11 illustrates another plurality of example steps of the method of FIG. 9.
Figure 12:
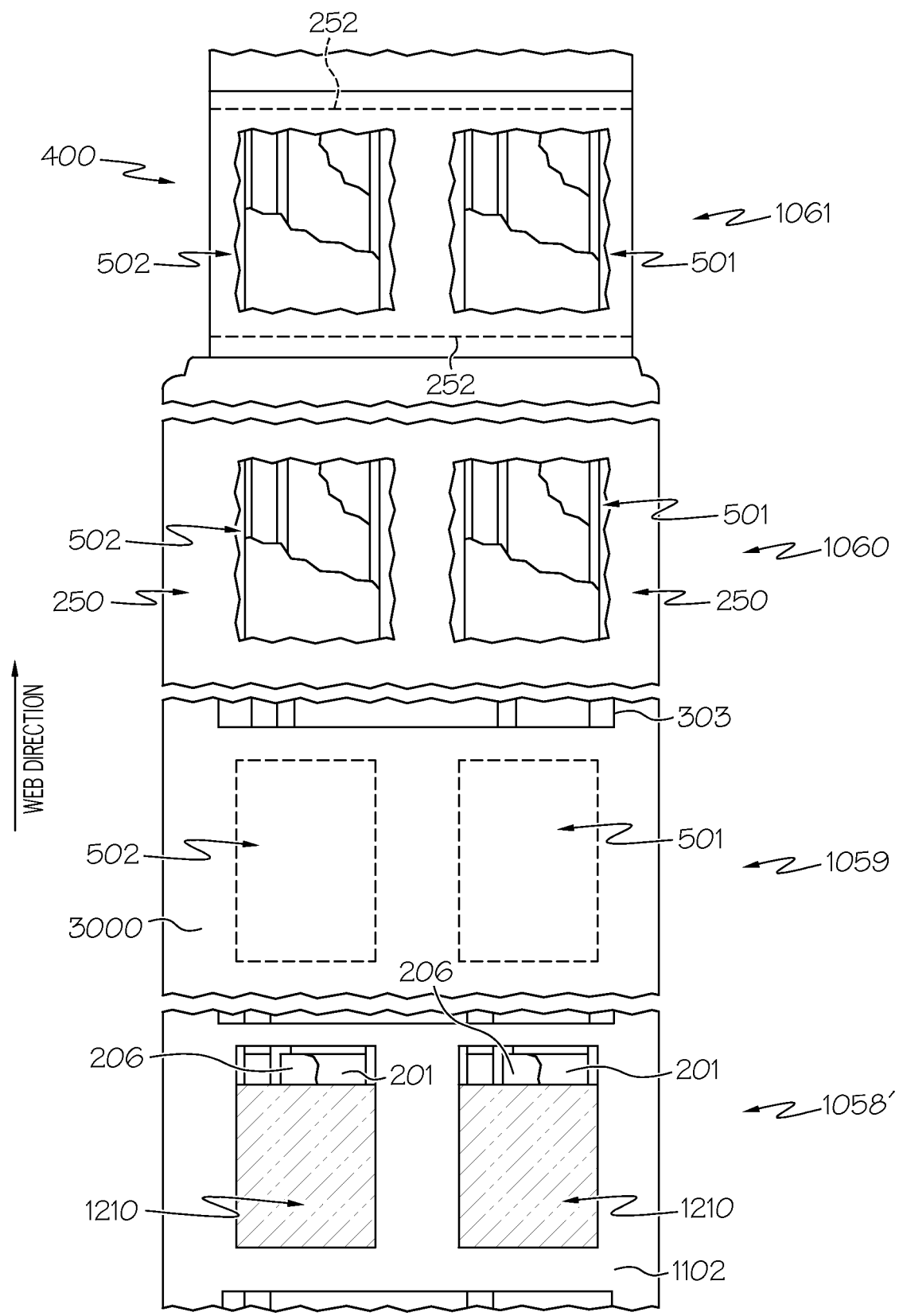
FIG. 12 illustrates still yet another plurality of example steps of the method of FIG. 9.

After the web is turned over so that the first side 1001 of the first substrate 1000 can be processed, the cells/batteries can be constructed according to the following example process shown in FIGS. 10-12. While the following steps will be discussed with reference to various "stations" that the first substrate 1000 encounters, it is to be understood that these "stations" may or may not involve discrete stations and/or steps, and that any or all of the "stations" and/or steps may be performed by one or more machines, and/or even manually. Moreover, any or all of the that various "stations" and/or steps may be combined, and/or even performed simultaneously.

Turning to FIG. 10, step 806 provides that n the first print station 1051 the cathode collector 201 is screen printed onto the first side 1001 of the first substrate 1000 with a highly conductive carbon ink. The area in which the through holes 104, 105 are located are not printed with carbon thus allowing an electrical coupler, such as silver contact ink, to be printed or laminated later in the process to fill the through holes 104, 105.

The cathode collector 201 can include various materials, such as a highly conductive carbon ink (e.g., PM024) such as manufactured by Acheson Colloids of Port Huron, Mich. The cathode collector 201 can be printed on the lower laminate by commercial means such as screen printing, for example using a very coarse screen of about 61 mesh (about 20-100 mesh for some embodiments) to allow for a dry deposit of about 1 mil (about 1.2-0.4 mils respectively). A cell with a size of about 2"×2" would thus have a resistance of about 60 ohms (about 40-100 ohms). To further reduce this resistance, a highly conductive contact could be printed at the external contact area of the positive electrode. The material used in this example construction is a silver filled conductive ink (SS479) manufactured by Acheson Colloids of Port Huron, Mich. which can be screen printed.

Other useable conductive materials, such as gold, tin, copper, nickel and/or mixtures of two or more conductive materials, along with other materials, could also be used for acceptable embodiments. Any of these conductive inks might be applied by means of, for example, a printing method, such as rotary screen, flexography, and gravure, as well as with ink jet printing techniques, for example. Additionally, manufactured foils of graphite and/or mixtures including one or more of conductive resins, metals, and graphite could be inserted and used, instead of printing an ink cathode collector. In applications where only very low currents are used, a highly conductive positive contact may not be utilized, and/or if somewhat higher currents are desired, the circuit contact might instead be used as the high conductivity contact.

Next, in step 808 at the second station 1052, a continuous strip of zinc foil/PSA laminate 1200 shown in FIG. 7 is laminated onto the first side 1001 of the first substrate 1000. Various materials can be used, such as an assembly comprised of the zinc foil at about 0.002" thick and PSA film at about 0.003" thick. A release liner can be removed just prior to laminating laminate 1200 to the first side 1001 of first substrate 1000.

In an example embodiment, a precut anode strip foil, which can be a laminate (and of possible dimensions of about: 1.75"×0.20"×0.002", for example), is inserted onto the lower substrate adjacent to the cathode collector/cathode assembly at a gap of about 0.050" (about 0.010"-0.100") from this assembly. Prior to insertion, the 2 mil thick battery grade zinc foil can be laminated to a dry film adhesive with a release liner, such as #2180, IB1190 or IB2130 manufactured by Morgan Adhesive Co. of Stow, Ohio. After this lamination is completed, for example on a wide roll of zinc (e.g., about 3-12' wide), this laminated structure can be slit into narrow rolls with a width of about 0.200" (about 0.170"-0.230") for an about 1 sq. inch cathode cell. Cells with other sizes of cathodes can utilize different slit widths for the anode laminate. In another construction, the lamination could be done with a printed adhesive on the substrate prior to applying the zinc foil strip, for example. Still, in other examples, the anode can be provided by a printing process. For example, the anode can be printed about 0.20" wide and about 0.002" (about 0.0003-0.005") thick, though various other widths and thicknesses are contemplated. Moreover, to make the printed anode even more conductive, an anode collector (not shown) can be printed under the anode, such as in a conductive pattern or the like.

Next, in step 810 at the third station 1053, a silver battery contact 202 can be printed on the right hand cell 501 and series connector bar 220 is screen printed over a portion of the top of cathode collector 225 of the left hand cell 502 and extended to the top of the anode 204 of the right hand cell 501 to connect the two unit cells into a 3 volt battery 501, 502 and to create the 3 volt battery negative 232 and positive 231 contacts. The battery silver positive contact 231 may be utilized for high drain applications. While printing the contacts discussed above battery contacts 231 and 232 also include making electrical contact the electronic application by means of filling the through holes 104, 105 with silver printing ink. In other words, the silver ink can electrically couple the cathode layer 206, such as via the cathode collector 201, the anode layer 1200, and the plurality of electrical contacts 234, 235. For ease of explanation and clarity Station #3 1053 is shown twice in FIG. 10.

Next, in step 812 at the fourth station 1054, a frame sealant 203 (i.e., shaded area), which can be an adhesive, can be printed around the perimeter of both unit cells 501 and 502 to form a "picture frame." The frame sealant 203 can be provided on top of the zinc anode 204 and over the cathode collector 225 in the seal area, as well as along a top 241, bottom 243, sides 245, and the centerpost 249. The frame sealant 203 can generally bound an inner space 230 that will define an interior volume of the battery cells 501, 502.

The frame sealant 203 can be provided as one frame surrounding both cells of the 3 volt battery package, as shown, though it can also be provided as separate elements. Though described as being printed, or the frame sealant 203 could also be formed from a pre-punched polymer sheet, such as polyvinyl chloride, polyester, or various other dielectric or electrically-neutral material. Additionally, though shown as having a generally rectangular geometry, the frame sealant 203 can have various other geometries so as to bound the battery cells 501, 502. In addition or alternatively, the frame sealant 203 can have an adhesive layer, such as a PSA layer or the like.

Next, in step 814 at the fifth station 1055, the cathode layer 206 can be screen-printed over part of the cathode collector 201 for both cells 501 and 502. In an example embodiment, the cathode layer 206, which is shaded and shown as a partial cut-away for clarity, can be printed on a portion of the previously printed and dried cathode collector layer 201 with an aqueous based ink that has a wet composition, for example, of about 43.4% of battery grade Manganese Dioxide (about 20%-60%), about 14.4% of KS-6 graphite (about 2%-25%), about 29.5% of about 6.5% (about 0.5%-15%) aqueous solution of polyvinylpyrrolidone (PVP) (about 20%-60%); and about 9.65% of De-ionized or distilled water (about 0.1%-20%). Such an ink can be printed with about a 46 mesh (about 10-65 mesh) fiberglass screen so as to allow a nominal dry lay down weight of about 0.10 grams per square inch (about 0.03-0.25 g/sq. in.). The amount of dry print would typically be dictated by the desired cell capacity, using more material when a higher capacity is desired, for example. By using this unconventional printing method utilizing a very coarse mesh screen instead of multiple hits of a finer mesh screen, the number of printing stations can be reduced and the cell performance can be increased.

The cathode layer (206) material used in this example construction includes, for example, an electrolytic manganese dioxide of high purity battery grade. The material particle size range for this embodiment is, for example, about 1 to 100 microns with an average size of about 40 microns. If additional fineness of the material is desired to facilitate the application to the collector, the material can be milled to achieve a particle size range of about 1 to 20 microns, with an average of about 4 microns, if desired. Other usable electro-active cathode materials that may be used in conjunction with the zinc anode in the subject construction, are silver oxides $Ag_2O$ and/or AgO, mercuric oxide HgO, nickel oxide NiOOH, oxygen $O_2$ (as in the form of an air cell, for example), and Vanadium oxide $VO_2$, for example. Cathodic materials that may be used with different anodic materials include one or more of NiOOH with Cd, NiOOH with metal hydrides of the $AB_2$ and the $AB_3$ types, and NiOOH with Fe and $FES_2$, for example.

A binder used in the cathode layer of an example embodiment includes a class of high molecular weight binders that exceed about 950,000-grams/mole. One such polymer that can be used is polyvinylpyrrolidone, about K 85-95 or about K 120 (higher molecular weight). Other classes of materials that can be used include one or more of the following: polyvinyl alcohol; classes of starches and modified starches, including rice, potato, corn, and bean varieties; ethyl and hydroxy-ethyl celluloses; methyl celluloses; polyethylene oxides; polyacryamides; as well as mixtures of these materials. Additional binding may be derived, if desired, from the use of Teflon solutions or Teflon fibrillated during the blending process.

Next, at step 816 at the sixth station 1056, the third substrate web 1100 can be laminated over the first substrate 1000 to provide the frame to form the inner space for the battery cells 501, 502. It is to be understood that the third substrate web 1100 can be used together with, or independent of, the aforedescribed frame sealant 203. Generally, the third substrate web 1100 can be utilized as a spacer as it is generally relatively thicker than the frame sealant 203. The third substrate web 1100 can be laminated over the first substrate 1000 with the picture frame cutouts 301 and 302 around the active ingredients of the cells 501, 502. Similarly, the cutouts 303 can be located for the cells and battery contact areas onto the first substrate 1000. The cutouts 303 can facilitate the electrical coupling of the cells 501, 502 with other components, such as various "off-board" components. However, where no "off-board" components are intended, the third substrate web 1100 may not include the cutouts 303. The adhesive layer 1102 of the third substrate web 1100 can be applied onto the first side 1001 of the first substrate 1000 after the release liner 1103 is removed. Further, though illustrated as a web, the third substrate 1100 can also be provided as discrete elements, such as discrete sheets or the like.

Next, at step 818 at the seventh station 1057, a "paper separator" 207 or another type of soak-up material can be inserted on top of the anode and the cathode. Alternatively, a "starch ink" or the electrolyte could be flowed or printed over the anode and cathode that are inside the picture frame.

Next, at step 820 at the eighth station 1058, (illustrated in both of FIGS. 11 and 12) when a paper separator is used, an electrolyte, such as an aqueous ZnCl2 electrolyte 210, is added to the top of the paper separator 207 which was placed over the cathode 206 and zinc 204.

Turning now to FIG. 12, and remaining with step 820, an alternative eighth station 1058' (prime) illustrates an alternative electrolyte configuration when a paper separator is not used. In the shown example, the electrolyte can be provided in the form of a viscous liquid (such as a flowable-gel) is added on the inside area of each unit cell. Due to its flow-ability, the electrolyte will generally spread out to uniformly to cover the anode and cathode. A printed electrolyte 1210 (e.g., using an ink or flowable gel) could be substituted for the liquid electrolyte and paper separator of the above referenced application.

Next, at step 822 at the ninth station 1059, the second substrate 3000 is added as a "top cover" to the top of the frame (i.e., the third substrate 1100). Thus, the second substrate 3000 generally seals the battery cells 501, 502. The seal of the second substrate 3000 can be provided by a layer of pressure sensitive adhesive 1102 on the spacer web 1100 and/or a heat seal layer on the bottom side of second substrate 3000, such as a double-sided adhesive configuration previously discussed with reference to FIG. 6.

Next, at step 824 at the tenth station 1060, the cells 501 and 502 are completely sealed around their perimeter after pressure and/or heat is applied. This sealing forms the battery seal 250. The unit cells 501, 502 are visible due to the cut-away view of the top cover 3000.

Next, at step 826 and before reaching the eleventh station 1061, all three substrates 1000, 1100, 3000 are slit on the outside edge of each cells 501 and 502 seal area, thus forming a roll(s) 400 of integrated electronic devices 999 with a 3 volt power source. It is to be understood that the number of rolls 400 can vary depending on various factors, such as on the web width and the width of each device, etc.

Next, at step 828 at the eleventh station 1061, the integrated electronic device 999 with the three volt battery can be perforated in the transverse direction along a line 252 between the trailing edge of one battery and the top edge of the next battery contacts 232 and 231. The perforations can facilitate separation of the integrated electronic devices 999 from the roll 400. Either or both of the slits and the perforations can be performed using various methods, such as a rotary die or the like.

Next, at the final step 830 (which can be a twelfth station, not shown), the RFID devices 999 can be rolled onto a roll 400 for storage, transport, etc. such as is illustrated in FIG. 4. Still, the devices 999 can be stored in various other manners. In one example, instead of perforations, the devices 999 can be complete separated from each other along the transverse perforation line 252, and the devices 999 can be stored as generally flat units.

Figure 13:
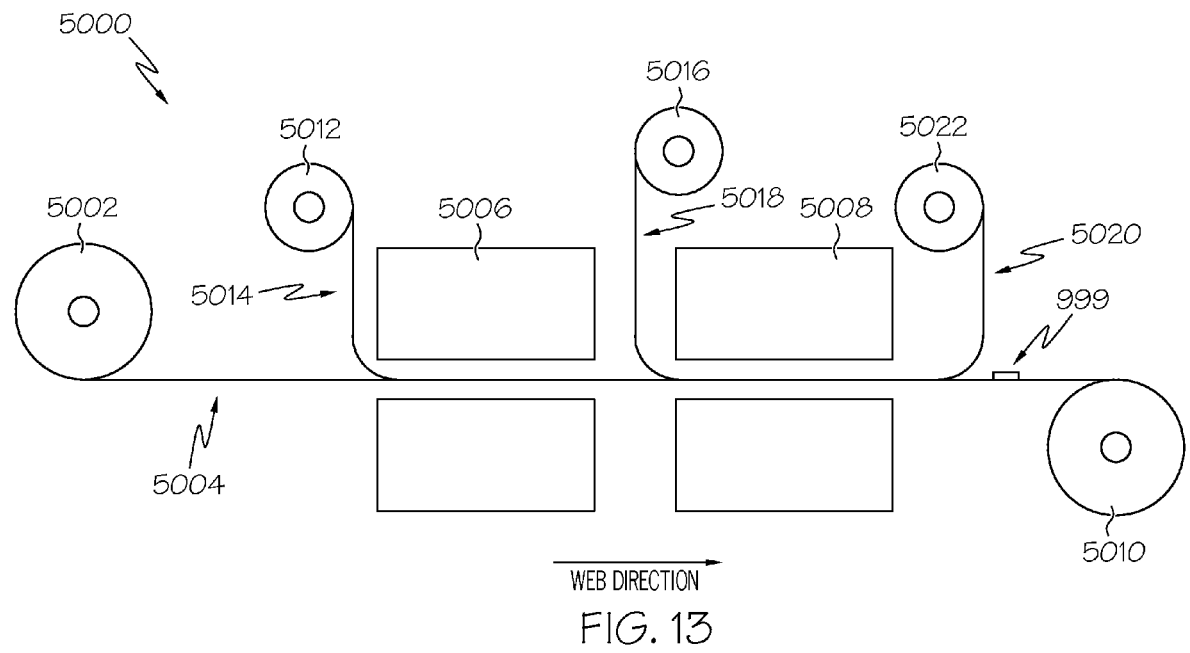
FIG. 13 illustrates a schematic view of an example manufacturing process utilizing a generally continuous web.

Turning now to FIG. 13, a schematic view of an example manufacturing process 5000 of the various steps shown in FIGS. 9-12, is illustrated utilizing a generally continuous web 5004. As discussed herein, any or all of the substrates 1000, 1100, 3000 can be provided as generally continuous webs that can be processed through a "reel-to-reel" style manufacturing process. For example, the first substrate 1000 can be provided as a generally continuous web 5004 from a source station 5002, which can be a source roll or the like. Some or all of the various processing steps, such as, for example, the steps of providing said cathode layer, providing said anode layer, and electrically coupling the cathode layer, anode layer and the active RFID assembly through the first substrate, can then be performed by passing the generally continuous web 5004 through a printing station 5008. Though only a single printing station 5008 is illustrated, it is to be understood that multiple printing stations can be utilized. In addition or alternatively, though not illustrated, the process 5000 can be adapted to pass the web 5004 through the printing station 5008 in multiple passes. Finally, the completed active RFID devices 999 on the generally continuous web 5004 can be collected at a take-up station 5010, which can include a collection roll, such as the roll 400 previously described herein.

The manufacturing process 5000 can include various other stages, steps, etc. For example, prior to the printing station 5008, the web 5004 can pass through an RFID station 5006 wherein the RFID assemblies 99 can be provided. In addition or alternatively, an RFID reading/encoding station (not shown) can also provided in line. Moreover, any or all of the various layers, substrates, etc. can be provided by supplemental rolls along the process. For example, a portion of the RFID assemblies 99 can be provided by a first supplemental roll 5012 via a supplemental web 5014. In another example, either or both of the second or third substrates 1100, 3000 can be provided by a second supplemental roll 5016 via another supplemental web 5018. Though illustrated near the beginning of the printing station 5008, it is to be understood that any or all of the supplemental webs 5014, 5018 can be provided at various locations along the manufacturing process 5000. In addition or alternatively, waste material, such as release layers or the like, can be removed from as a waste web 5020 and taken-up by a waste roll 5022 or the like. Various other pre-processing and/or post-processing stations, steps, etc. can also be included. It is to be understood that the various stations, rolls, etc. of the described process 5000 can be utilized in various orders, and additional equipment may even be provided (e.g., idler rollers, tension rollers, turn-bars, slit or perforators, etc.) to facilitate the "reel-to-reel" process.

Various other additional steps (not shown) can be utilized to provide additional structure, features, etc. to the completed RFID device 999. In one example, an outer portion of the device 999, such as the second substrate 3000 "top cover", can be provided with a method of attaching the device 999 to another object, surface, etc. For example, the second substrate 3000 can include a pressure sensitive adhesive, another adhesive layer, a hook-and-loop style fastener, a liquid or hot-melt adhesive, etc. In another example, an outer portion of the device 999, such as the second substrate 3000 "top cover", can be provided with printed indicia or even a label or the like.

Thin printed flexible batteries can have many potential applications, which can include one or more of the following generally categories as examples:

1. RFID assemblies
2. Advertising and promotion;
3. Toys, novelties, books, greeting cards, and games;
4. Inventory tracking and control such as (smart RFID tags);
5. Security tags;
6. Condition indicators such as temperature, humidity, etc.;
7. Skin patches that apply iontophoresis or other electrical function for the purpose of drug delivery, wound care, pain management and/or cosmetics; and
8. Healthcare products such as smart diapers, incontinence products, etc.

The invention has been described hereinabove using specific examples and embodiments; however, it will be understood by those skilled in the art that various alternatives may be used and equivalents may be substituted for elements and/or steps described herein, without deviating from the scope of the invention. Modifications may be performed to adapt the invention to a particular situation or to particular needs without departing from the scope of the invention. It is intended that the invention not be limited to the particular implementations and embodiments described herein, but that the claims be given their broadest interpretation to cover all embodiments, literal or equivalent, disclosed or not, covered thereby.

What is claimed is:

1. A method of manufacturing an RFID device including a flat electrochemical cell for generating an electrical current, said method including the steps of:

providing a first substrate and a second substrate, at least one of which includes a plurality of layers, said first substrate including a first side and a second side;

providing an RFID assembly on said second side of said first substrate, including a RFID antenna, an RFID element in communication with the RFID antenna, and a plurality of electrical contacts in electrical communication with the RFID element;

printing or laminating a cathode layer on said first side of said first substrate;

printing or laminating an anode layer on said first side of said first substrate;

providing an electrolyte layer including a viscous liquid in contact with said cathode layer and also in contact with said anode layer;

electrically coupling the cathode layer, the anode layer, and the plurality of electrical contacts; and connecting said second substrate to said first substrate to substantially seal an inner space containing said cathode layer, said anode layer, and said electrolyte layer, further comprising the step of providing a frame on said first side of said first substrate to form the inner space containing said electrolyte, and also containing at least a major portion of said cathode layer and at least a major portion of said anode layer within said inner space, and further including the step of providing the frame as a third substrate including a web having a plurality of laminated layers, wherein at least one of said laminated layers is a pressure-sensitive adhesive.

2. The method of claim 1, wherein at least one of the first substrate and the second substrate includes a web having a plurality of layers.

3. The method of claim 1, wherein the step of providing an RFID assembly further includes the steps of (i) providing an RFID element on said second side of said first substrate; and (ii) printing an RFID antenna and a plurality of electrical contacts on said second side of said first substrate so as to be in electrical contact with said RFID element, wherein each of said RFID antenna and plurality of electrical contacts include a cured or dried ink.

4. The method of claim 1, wherein the step of electrically coupling the cathode layer, anode layer, and the plurality of electrical contacts further includes the steps of (i) providing a plurality of apertures extending through said first substrate so as to be in communication with each of the cathode layer, anode layer, and the plurality of electrical contacts; and (2) filling each of said plurality of apertures with a conductive ink for providing said electrical communication between the cathode layer, anode layer, and the plurality of electrical contacts.

5. The method of claim 4, wherein said conductive ink of said plurality of apertures includes at least one of silver and copper.

6. The method of claim 1, further including the step of providing cutout cavity extending through said third substrate and oriented so as to be in communication with at portion of said cathode layer and a portion of said anode layer.

7. The method of claim 1, further including the step of providing a frame sealant disposed on said first substrate generally bounding a perimeter of said inner space, and wherein said frame sealant is interposed between said first substrate and said frame.

8. The method of claim 1, further including the step of providing one or both of (1) a cathode collector layer between said cathode layer and said first substrate; and (2) an anode collector layer between said anode layer and said first substrate.

9. The method of claim 1, wherein the anode includes zinc.

10. The method of claim 1, wherein the first substrate layer comprises a plurality of laminated layers including a first oxide barrier layer having a gas transmission rate that permits gas to escape through said plurality of laminated layers of the first substrate layer.

11. A method of manufacturing an RFID device including a flat electrochemical cell for generating an electrical current, said method including the steps of:
providing a first substrate and a second substrate, at least one of which includes a plurality of layers, said first substrate including a first side and a second side;
providing an RFID assembly on said second side of said first substrate, including a RFID antenna, an RFID element in communication with the RFID antenna, and a plurality of electrical contacts in electrical communication with the RFID element;
providing a cathode layer on said first side of said first substrate;
providing an anode layer on said first side of said first substrate;
providing an electrolyte layer including a viscous liquid in contact with said cathode layer and also in contact with said anode layer;
electrically coupling the cathode layer, the anode layer, and the plurality of electrical contacts; and
connecting said second substrate to said first substrate to substantially seal an inner space containing said cathode layer, said anode layer, and said electrolyte layer, further comprising the steps of providing a plurality of cathode layers and a plurality of anode layers, and electrically connecting said plurality of cathode layers and anode layers together to form a battery.

12. A method of manufacturing an RFID device including a flat electrochemical cell for generating an electrical current, said method including the steps of:
providing a first substrate and a second substrate, at least one of which includes a web having a plurality of layers, said first substrate including a first side and a second side;
providing an RFID assembly on said second side of said first substrate, including the steps of (i) providing an RFID element on said second side of said first substrate; and (ii) printing an RFID antenna and a plurality of electrical contacts on said second side of said first substrate so as to be in electrical contact with said RFID element, wherein each of said RFID antenna and plurality of electrical contacts include a cured or dried ink;
printing a cathode collector layer on said first side of said first substrate;
printing a cathode layer on said first side of said first substrate;
printing an anode layer on said first side of said first substrate;
providing an electrolyte layer including a viscous liquid in contact with said cathode layer and also in contact with said anode layer;
electrically coupling the cathode layer via the cathode collector, the anode layer, and the plurality of electrical contacts; and
connecting said second substrate to said first substrate to substantially seal an inner space containing said cathode layer, said anode layer, and said electrolyte layer,
wherein the step of electrically coupling the cathode layer, anode layer, and the plurality of electrical contacts further includes the steps of (1) providing a plurality of apertures extending through said first substrate so as to be in communication with each of the cathode layer, anode layer, and the plurality of electrical contacts; and (2) filling each of said plurality of apertures with a conductive ink for providing said electrical communication between the cathode layer, anode layer, and the plurality of electrical contacts.

13. The method of claim 12, further comprising the step of providing a frame on said first side of said first substrate to form the inner space containing said electrolyte, and also containing at least a major portion of said cathode layer and at least a major portion of said anode layer within said inner space.

14. The method of claim 13, further including the step of providing the frame as a third substrate including a web having a plurality of laminated layers, wherein at least one of said laminated layers is a pressure-sensitive adhesive.

15. The method of claim 14, further including the step of providing a cutout cavity extending through said third substrate and oriented so as to be in communication with at portion of said cathode layer and a portion of said anode layer.

16. The method of claim 12, further comprising the steps of providing a plurality cathode layers and a plurality of anode layers, and electrically connecting said plurality of cathode layers and anode layers together to form a battery.

17. An RFID device including a flat electrochemical cell for generating an electrical current, said RFID device including:
a first substrate including of a plurality of laminated layers and defining a first side and a second side;
a second substrate;
an RFID assembly provided on said second side of said first substrate, including a RFID antenna, an RFID element in communication with the RFID antenna, and a plurality of electrical contacts in electrical communication with the RFID element;
a cathode layer provided on said first side of said first substrate;
an anode layer provided on said first side of said first substrate;
an electrolyte layer including a viscous liquid in contact with said cathode layer and also in contact with said anode layer, wherein at least one of said anode layer and said cathode layer include a cured or dried ink; and
an electrical coupler assembly providing electrical communication between the cathode layer, the anode layer, and the plurality of electrical contacts,
wherein said electrical coupler assembly includes a plurality of apertures extending through said first substrate, the plurality of apertures being in communication with each of the cathode layer, anode layer, and the plurality of electrical contacts, and
wherein each of said plurality of apertures are filled with a conductive ink for providing said electrical communication between the cathode layer, anode layer, and the plurality of electrical contacts.

18. The device of claim 17, wherein said conductive ink of said plurality of apertures includes at least one of silver and copper.

19. The device of claim 17, wherein at least one of said RFID antenna and said plurality of electrical contacts include a cured or dried ink.

20. The device of claim 17, wherein only one of said cathode layer and said anode layer is comprised of a dried or cured ink, and wherein the other of said cathode layer and said anode layer is comprised of a strip of material.

21. The device of claim 17, further comprising a plurality said cathode layers and said anode layers electrically connected together to form a battery.

22. The device of claim 17, wherein one or both of (1) a cathode collector layer is provided between said cathode layer and said first substrate; and (2) an anode collector layer is provided between said anode layer and said first substrate.

23. The device of claim 17, said RFID device being a power-assisted passive RFID device.

24. The device of claim 17, further comprising a frame interposed between said first and second substrate to connect and seal said first substrate to said second substrate to form an inner space containing said electrolyte, and also containing at least a major portion of said cathode layer and at least a major portion of said anode layer within said inner space.

25. The device of claim 24, wherein said frame is a third substrate including of a plurality of laminated layers and a cutout cavity extending therethrough in communication with at portion of said cathode layer and a portion of said anode layer, wherein at least one of said laminated layers is a pressure-sensitive adhesive.

26. The device of claim 24, wherein said frame is a frame sealant disposed on said first substrate generally bounding a perimeter of said inner space, and wherein said frame sealant is interposed between said first substrate and said frame spacer.

27. A method of manufacturing an RFID device including a flat electrochemical cell for generating an electrical current, said method including the steps of:

providing a first substrate including a first side and a second side;

providing an RFID assembly on said second side of said first substrate;

providing a cathode collector layer on said first side of said first substrate;

providing a cathode layer on said first side of said first substrate;

providing an anode layer on said first side of said first substrate;

providing an electrolyte layer in contact with said cathode layer and also in contact with said anode layer; and electrically coupling the cathode layer via the cathode collector layer, the anode layer, and the RFID assembly through the first substrate, further comprising the step of providing a frame on said first side of said first substrate to form an inner space containing said electrolyte, and also containing at least a major portion of said cathode layer and at least a major portion of said anode layer within said inner space.

28. The method of claim 27, wherein said first substrate is provided as a generally continuous web from a source station, wherein the steps of providing said cathode layer, providing said anode layer, and electrically coupling the cathode layer, anode layer and the RFID assembly through the first substrate are performed by passing the generally continuous web through a printing station, and wherein the completed RFID device on the generally continuous web is collected at a take-up station.

29. The method of claim 28, wherein said first substrate is provided on a source roll at said source station, and wherein said completed RFID device is collected on a collection roll a said take-up station.

* * * * *

UNITED STATES PATENT AND TRADEMARK OFFICE
CERTIFICATE OF CORRECTION

PATENT NO. : 8,441,411 B2  Page 1 of 1
APPLICATION NO. : 12/669067
DATED : May 14, 2013
INVENTOR(S) : Tucholski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 505 days.

Signed and Sealed this
Eighth Day of September, 2015

Michelle K. Lee
*Director of the United States Patent and Trademark Office*